United States Patent
Gyoda

(10) Patent No.: US 6,671,030 B2
(45) Date of Patent: Dec. 30, 2003

(54) ELECTRO-OPTICAL DEVICE INCLUDING A CONTIGUOUS SEALING MEMBER AND METHOD FOR MANUFACTURING THE SAME

(75) Inventor: Kozo Gyoda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 09/840,093

(22) Filed: Apr. 24, 2001

(65) Prior Publication Data
US 2002/0063842 A1 May 30, 2002

(30) Foreign Application Priority Data

Apr. 27, 2000 (JP) .......................... 2000-128366

(51) Int. Cl.[7] .......................................... G02F 1/1339
(52) U.S. Cl. ...................................... 349/190; 349/153
(58) Field of Search ................................ 349/190, 153; 445/25; 156/102; 427/487; 118/725; 438/33

(56) References Cited

U.S. PATENT DOCUMENTS

| | | | | |
|---|---|---|---|---|
| 5,263,888 A | * | 11/1993 | Ishihara et al. ............... | 445/25 |
| 6,099,672 A | * | 8/2000 | Yamazaki et al. .......... | 156/109 |
| 6,122,033 A | * | 9/2000 | Mathew et al. ............. | 349/155 |
| 6,211,938 B1 | * | 4/2001 | Mori .......................... | 349/190 |
| 6,219,126 B1 | * | 4/2001 | Von Gutfeld ............... | 349/153 |
| 6,284,087 B1 | * | 9/2001 | von Gutfeld et al. ..... | 156/275.5 |
| 6,436,472 B1 | * | 8/2002 | Sago et al. ................. | 427/240 |
| 2001/0033357 A1 | * | 10/2001 | Niwa et al. ................. | 349/154 |

FOREIGN PATENT DOCUMENTS

| JP | A 5-134232 | 5/1993 |
|---|---|---|
| JP | 05-265011 | 10/1993 |
| JP | 06-194615 | 7/1994 |

* cited by examiner

Primary Examiner—Robert H. Kim
Assistant Examiner—Jeanne A DiGrazio
(74) Attorney, Agent, or Firm—Oliff & Berridge PLC

(57) ABSTRACT

An electro-optical device and a method for manufacturing the electro-optical device that requires no cleaning of an electro-optical material cell, and thereby results in a high production yield. The present invention includes forming an uncured sealing member having no injection port in a loop configuration in peripheral portions of respective substrate formation regions of a counter substrate base material. Further, applying a liquid crystal (an electro-optical material) in the area surrounded by the uncured sealing member in each substrate formation region to form a liquid crystal layer (an electro-optical material layer). The counter substrate base material and the substrate base material are then bonded together with the uncured sealing member interposed therebetween, thereby forming a liquid crystal cell base material (an electro-optical cell base material). The uncured sealing member is then cured, thereby forming a sealing member. The liquid crystal cell base material is diced along the outlines of the substrate formation region and the substrate formation region.

30 Claims, 18 Drawing Sheets

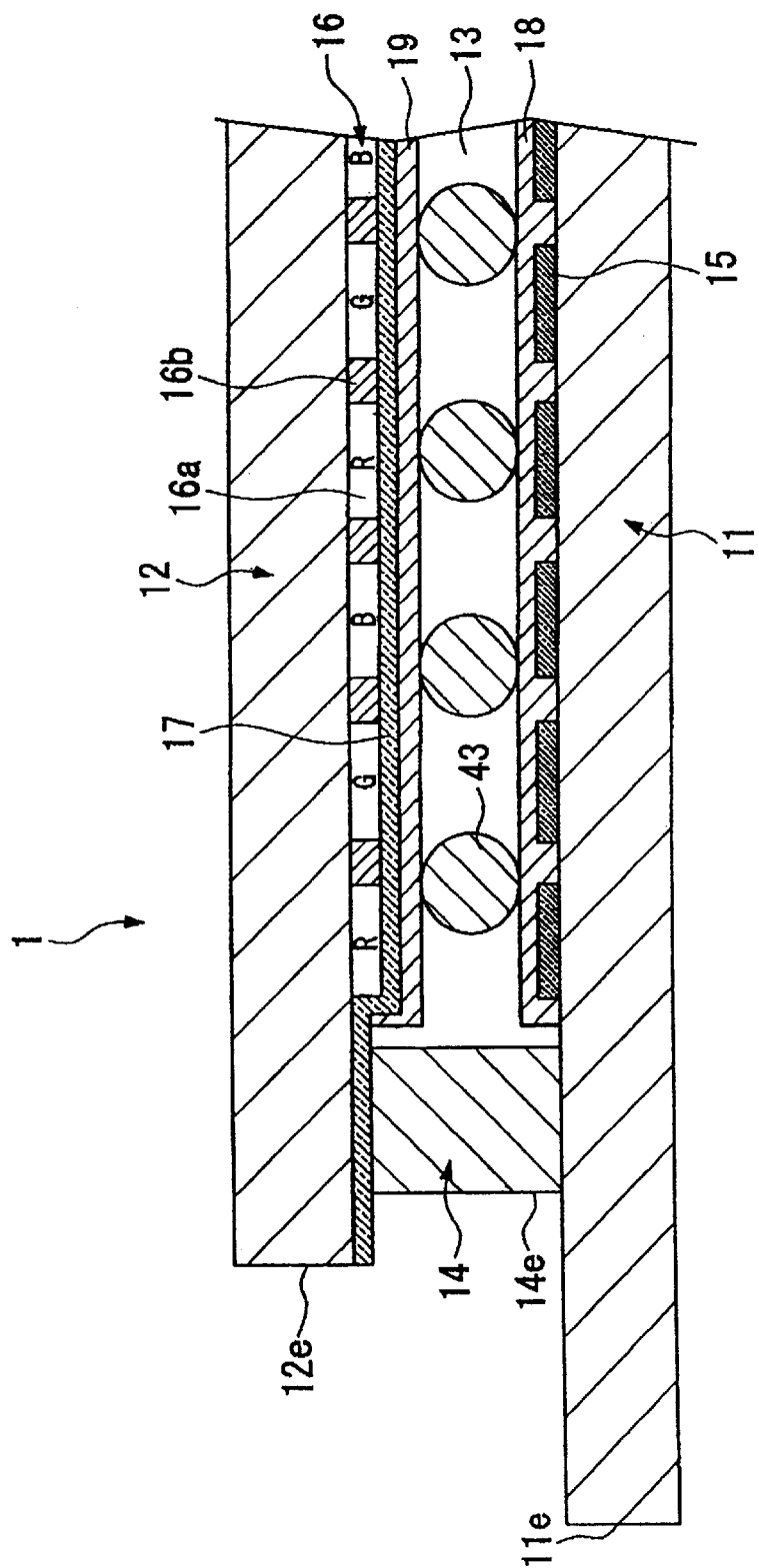
[FIG. 1]

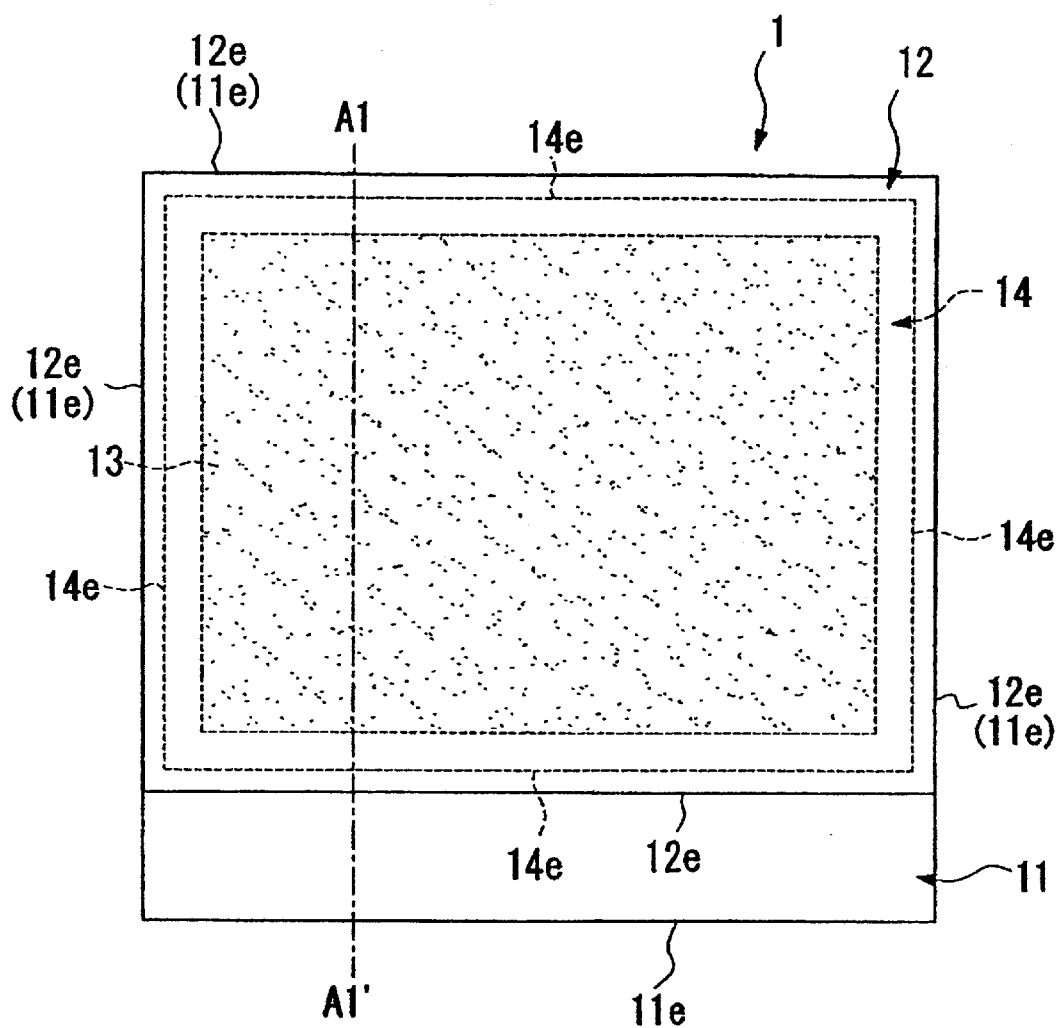
[FIG. 2]

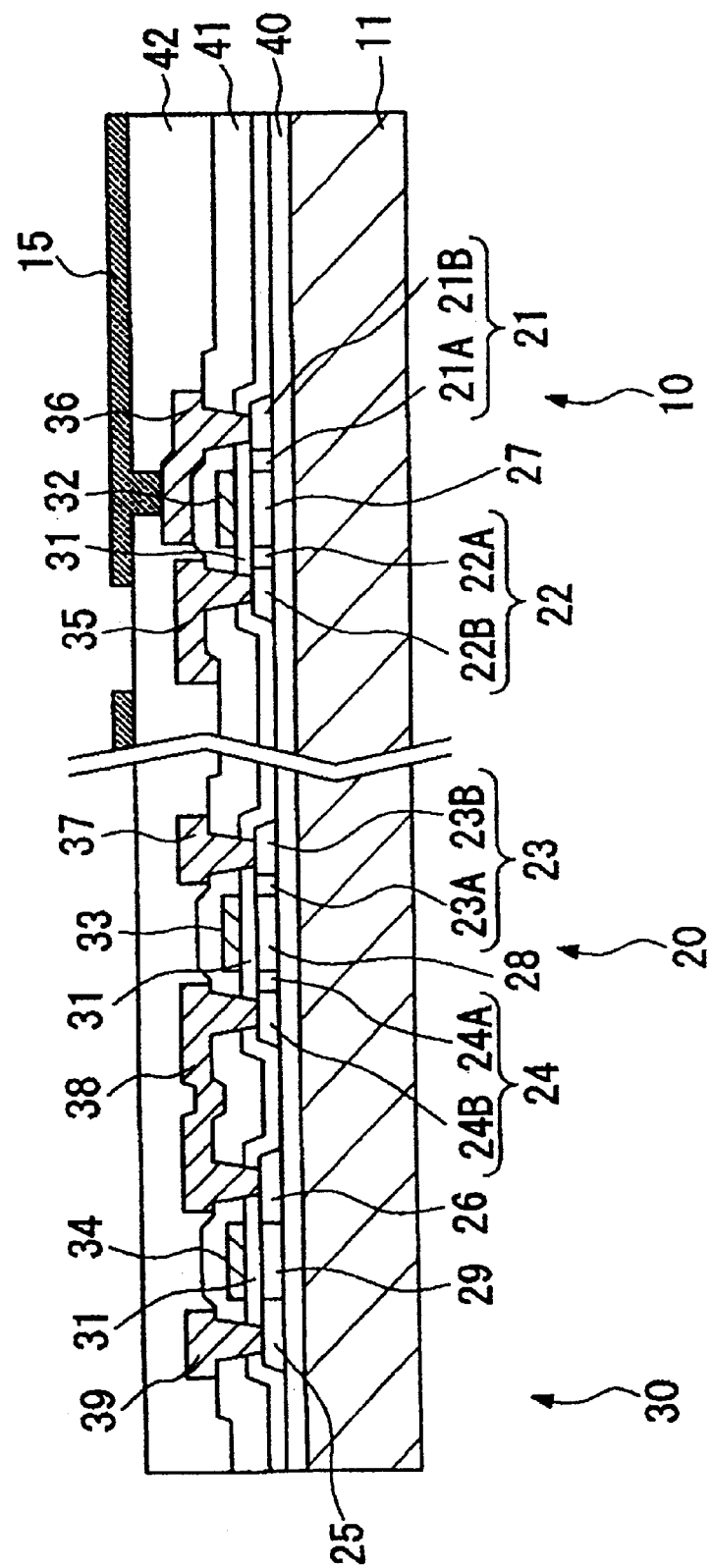
[FIG. 3]

[FIG. 4]
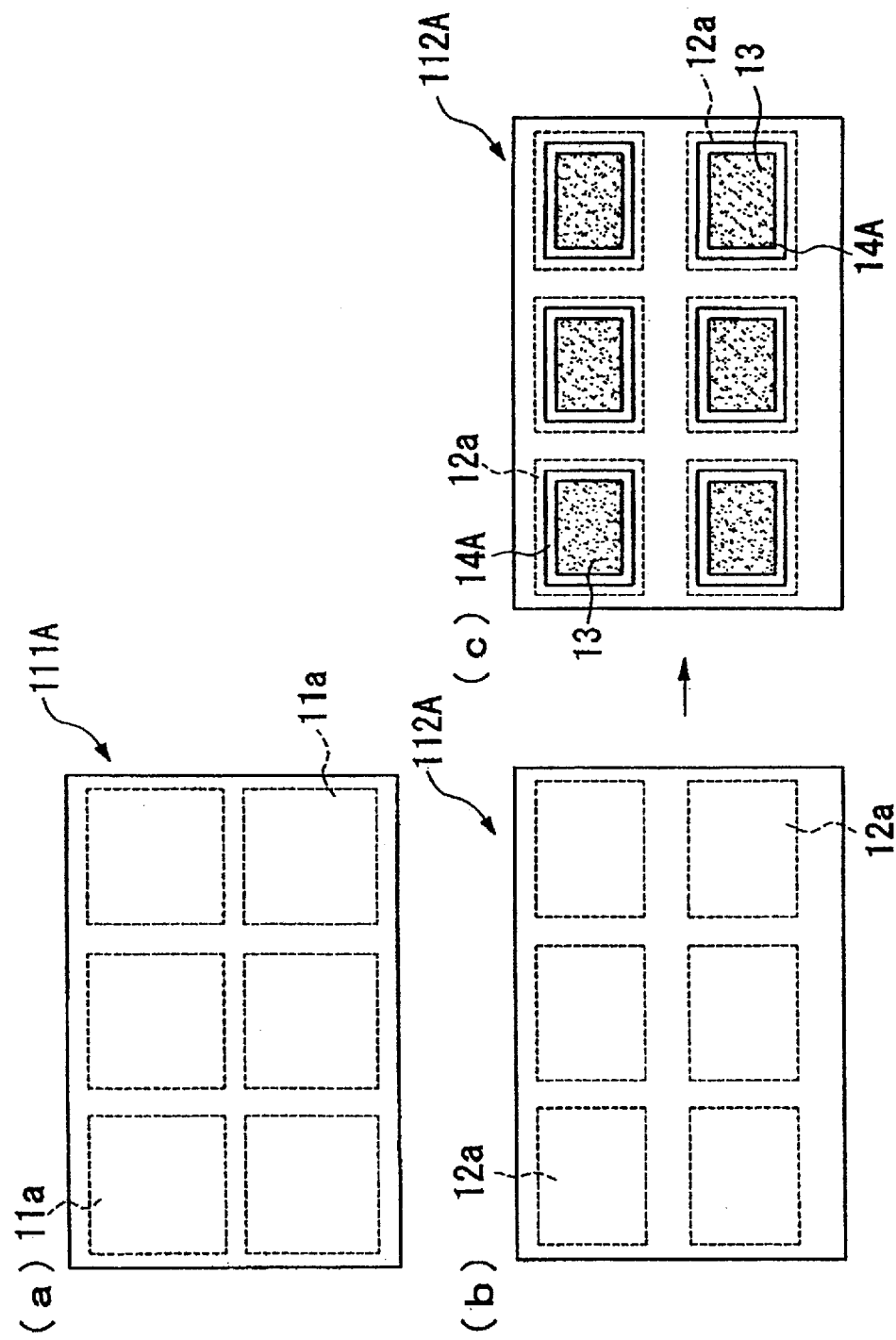

[FIG. 5]
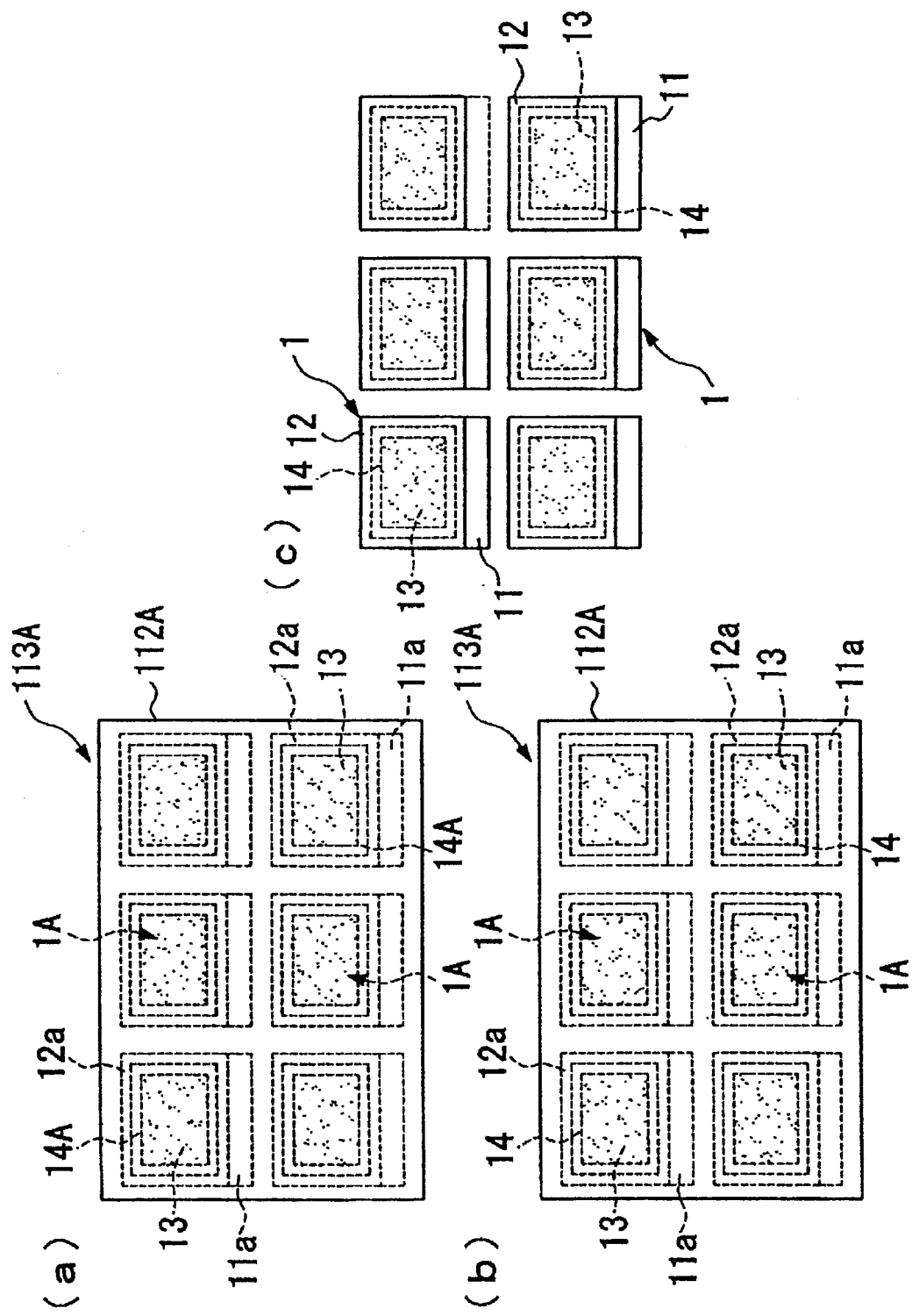

[FIG. 6]
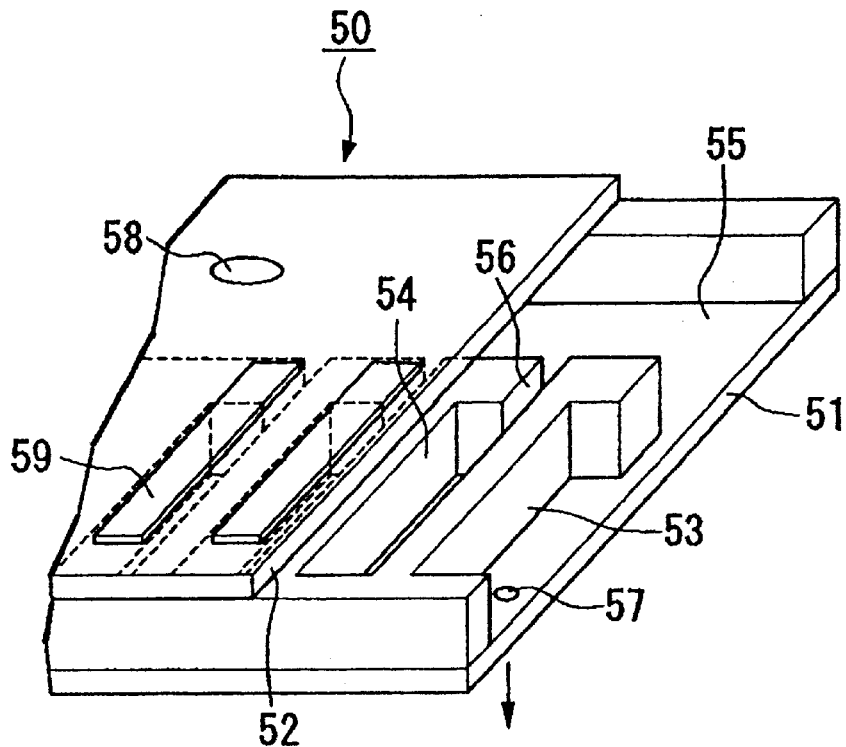
[FIG. 7]
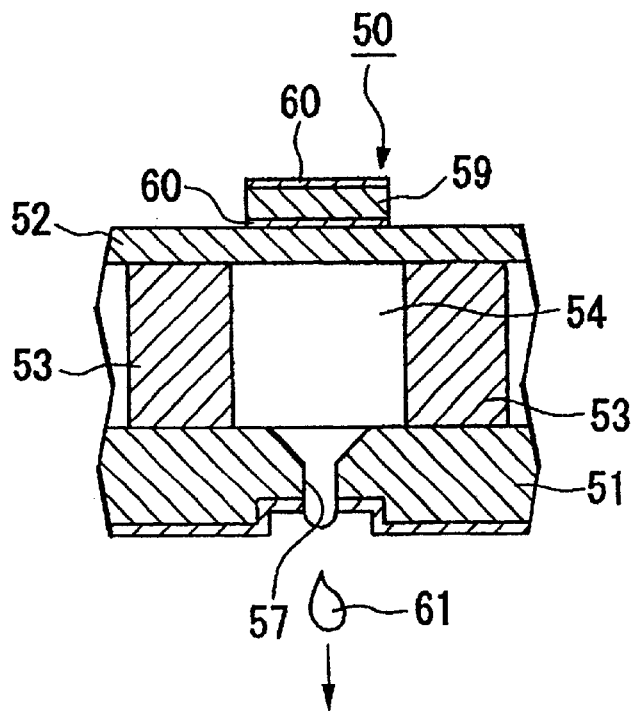

[FIG. 8]
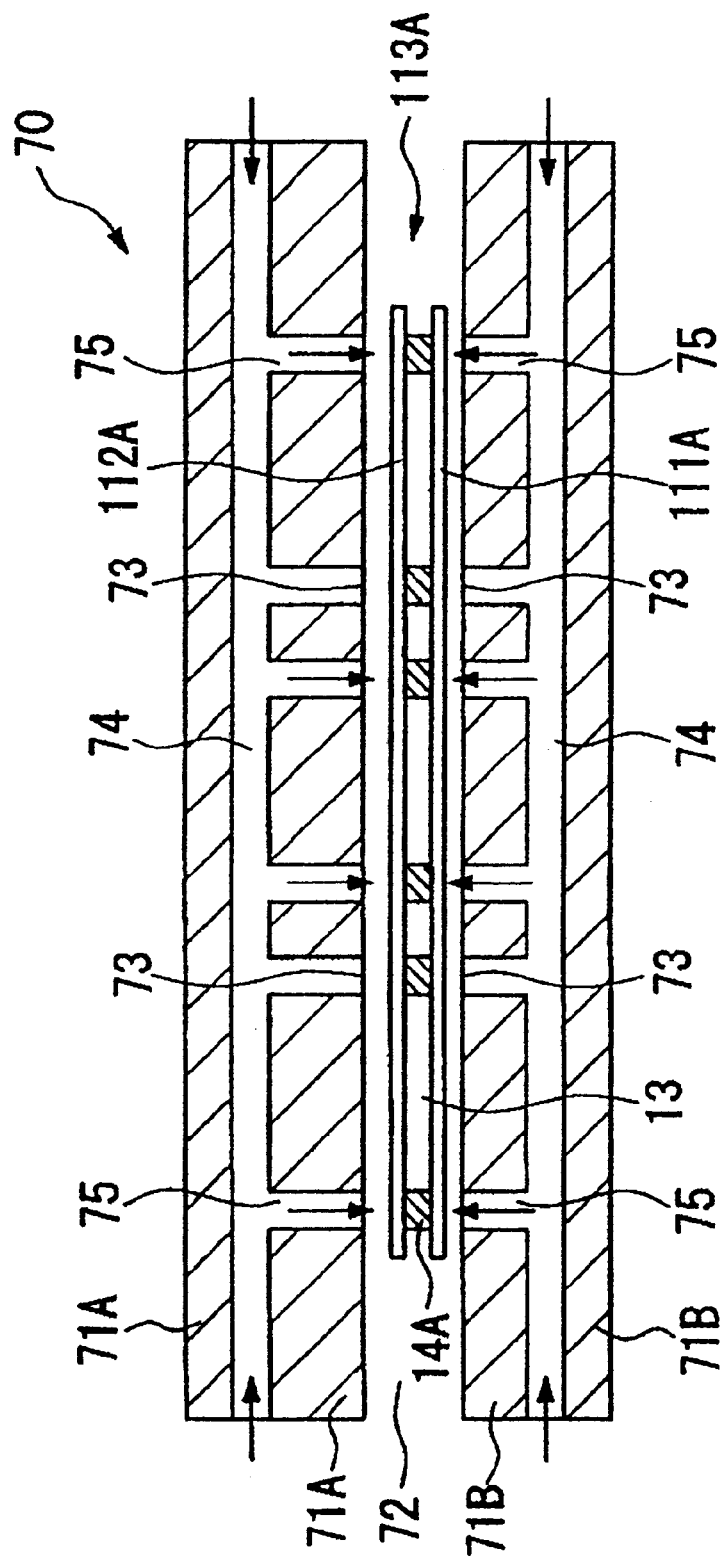

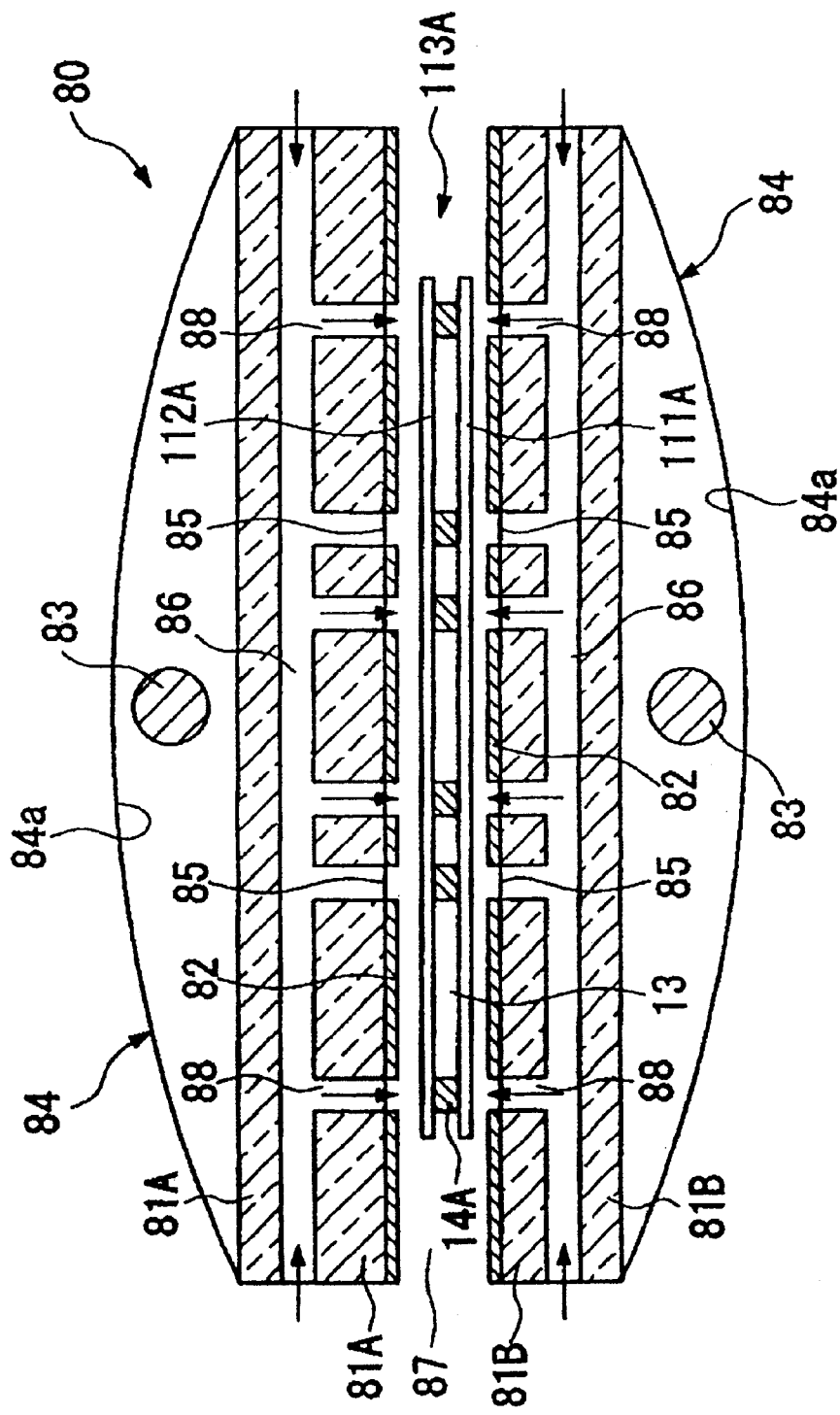
[FIG. 9]

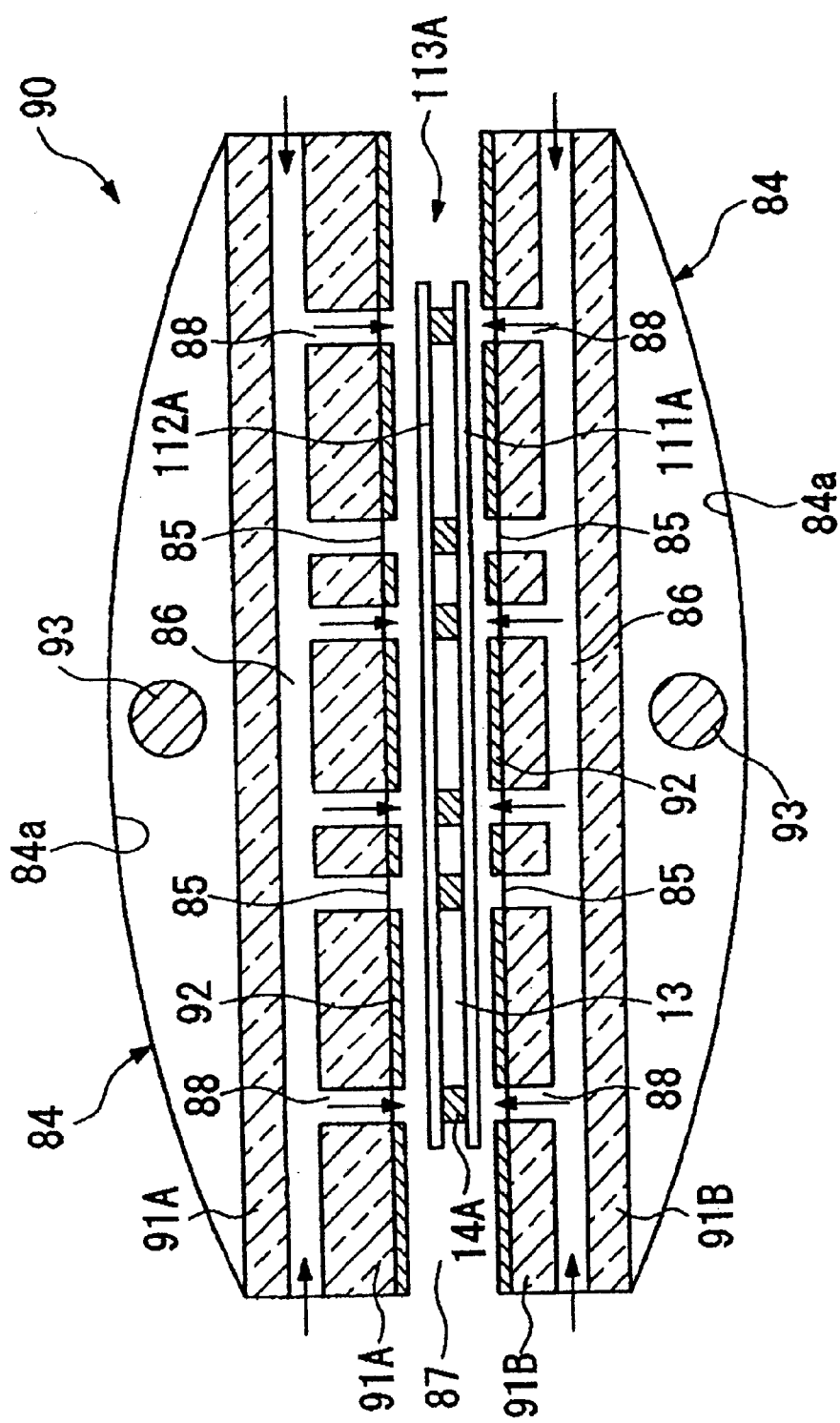
[FIG. 10]

[FIG. 11]
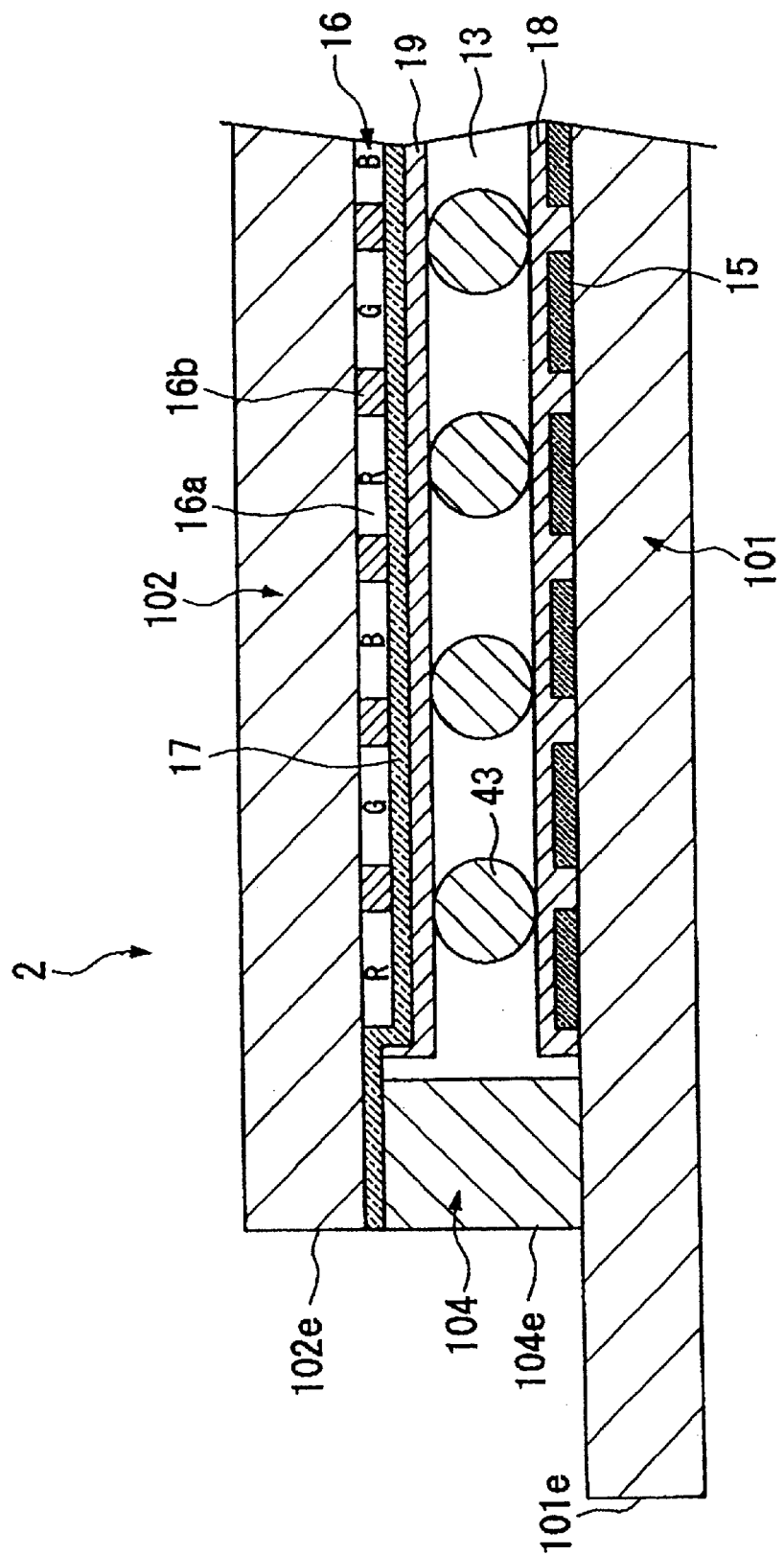

[FIG. 12]
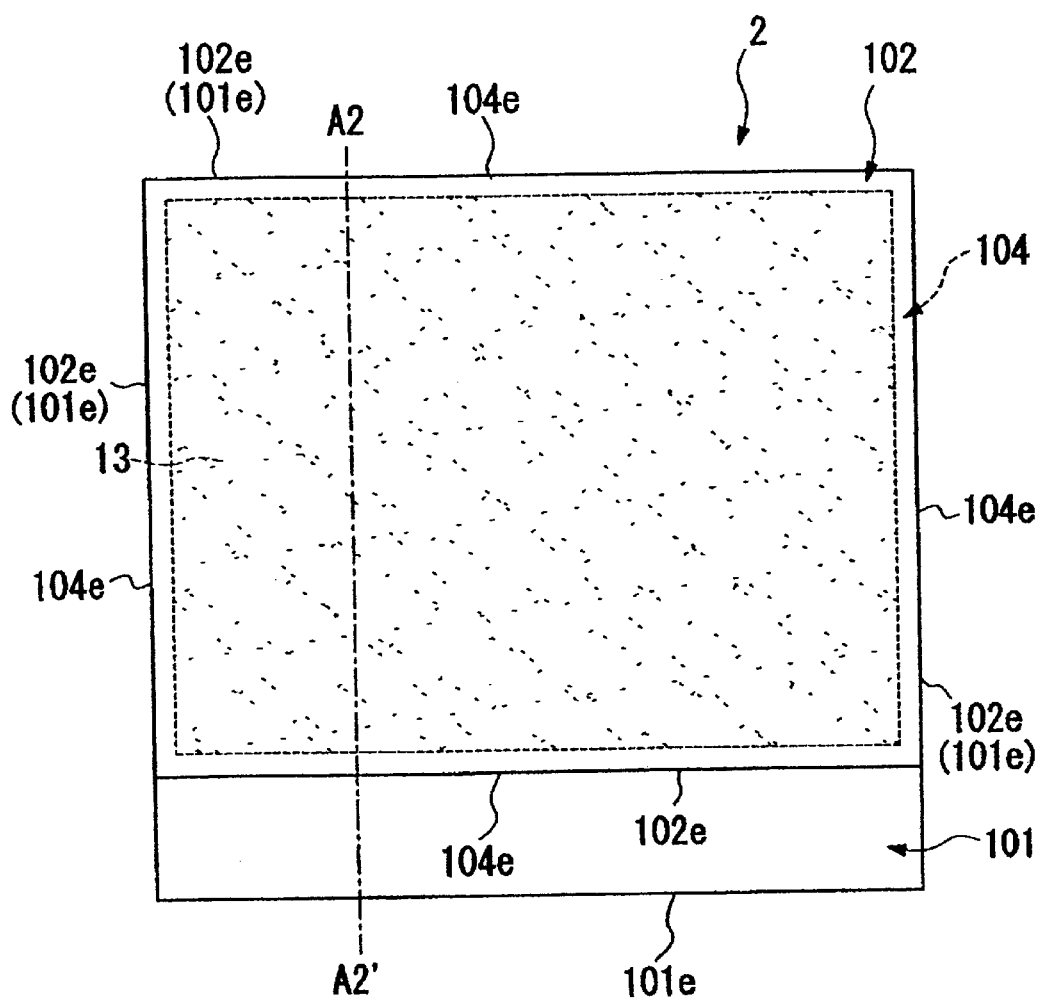

[FIG. 13]
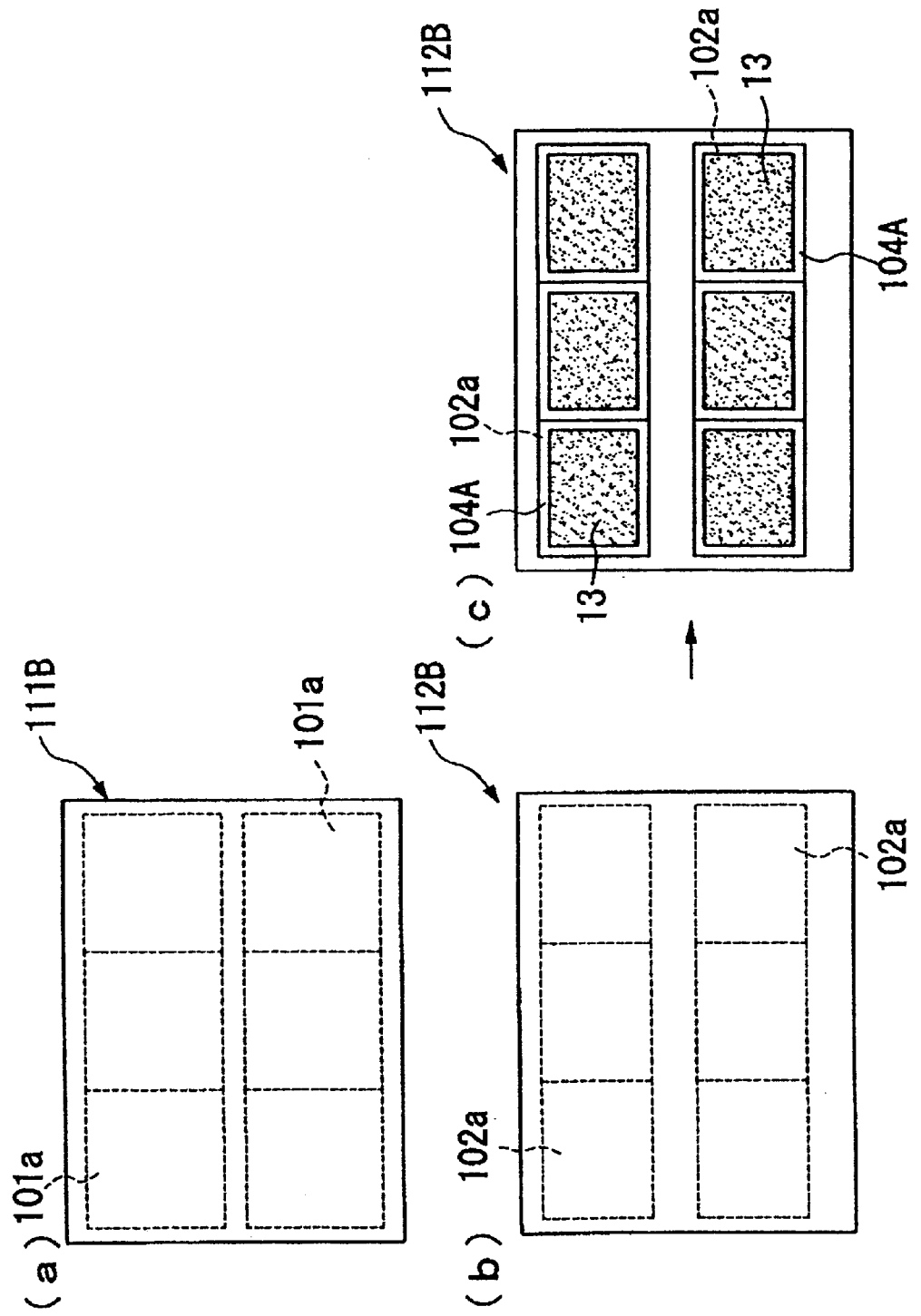

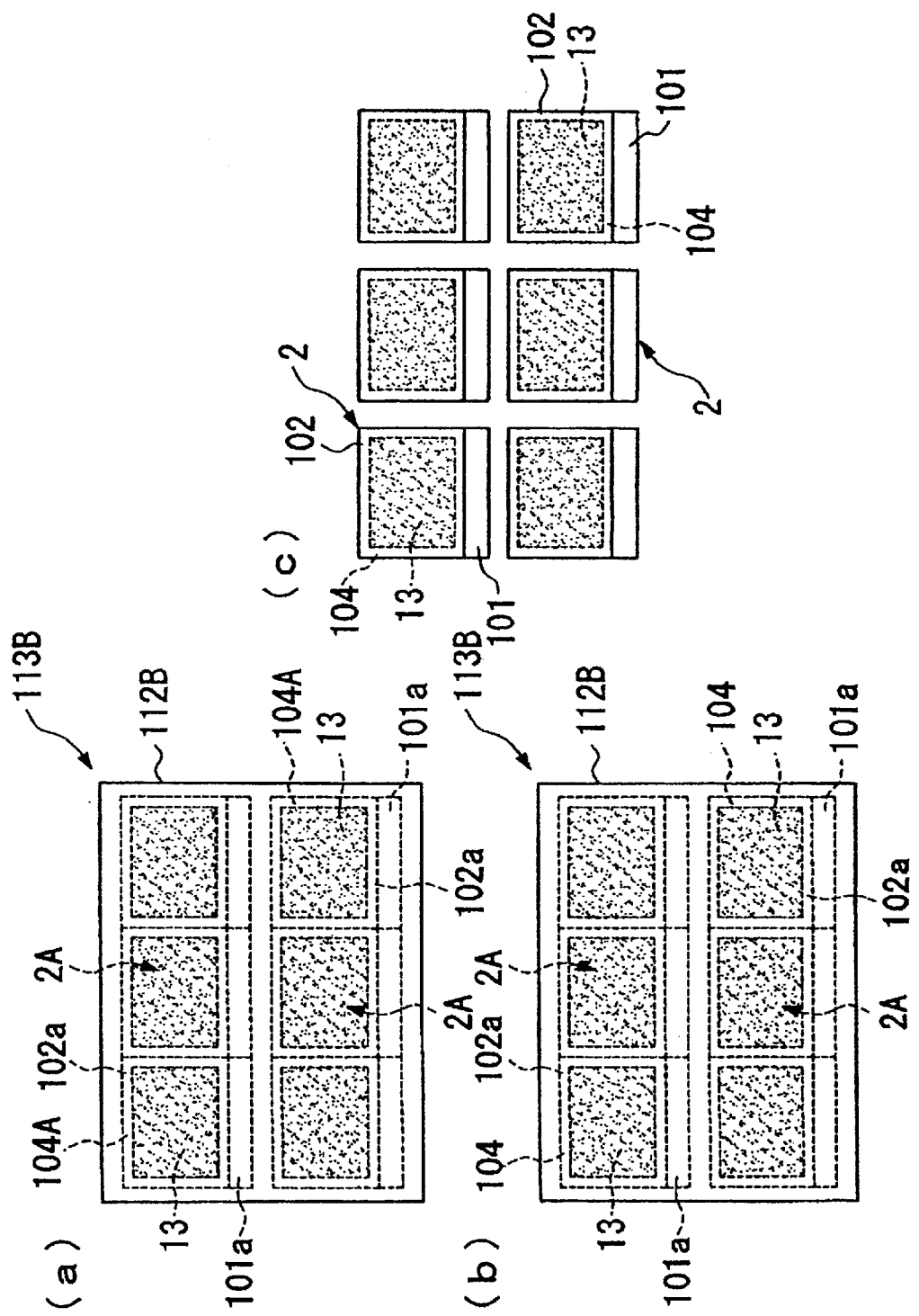
[FIG. 14]

[FIG. 15]
(a)
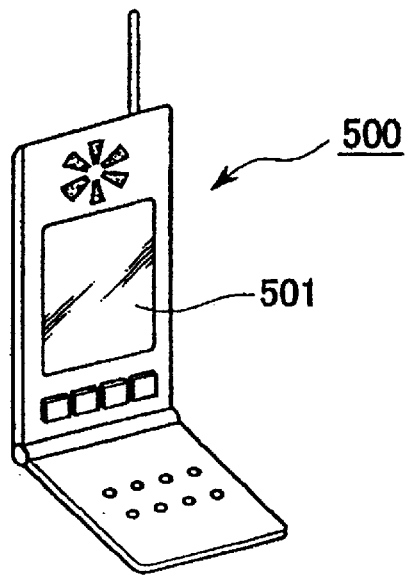
(b)
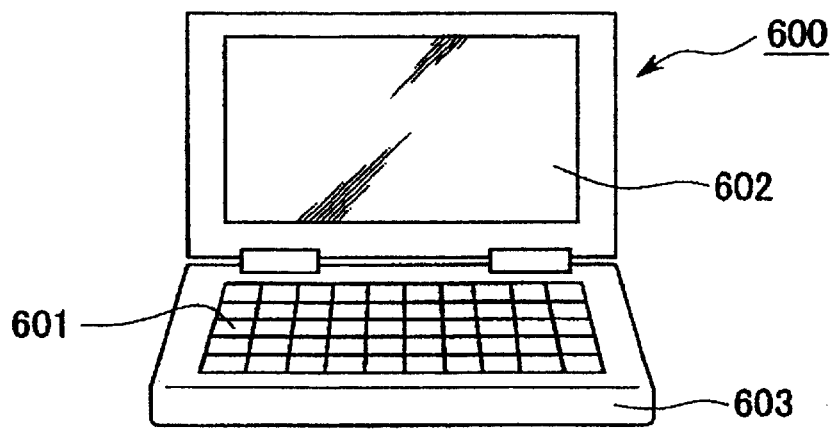
(c)
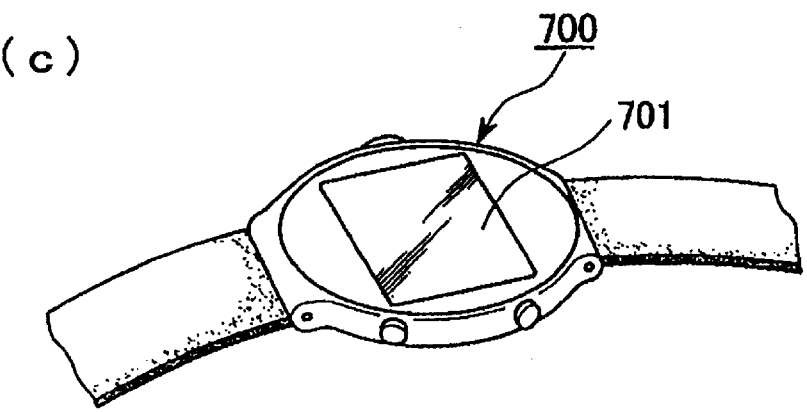

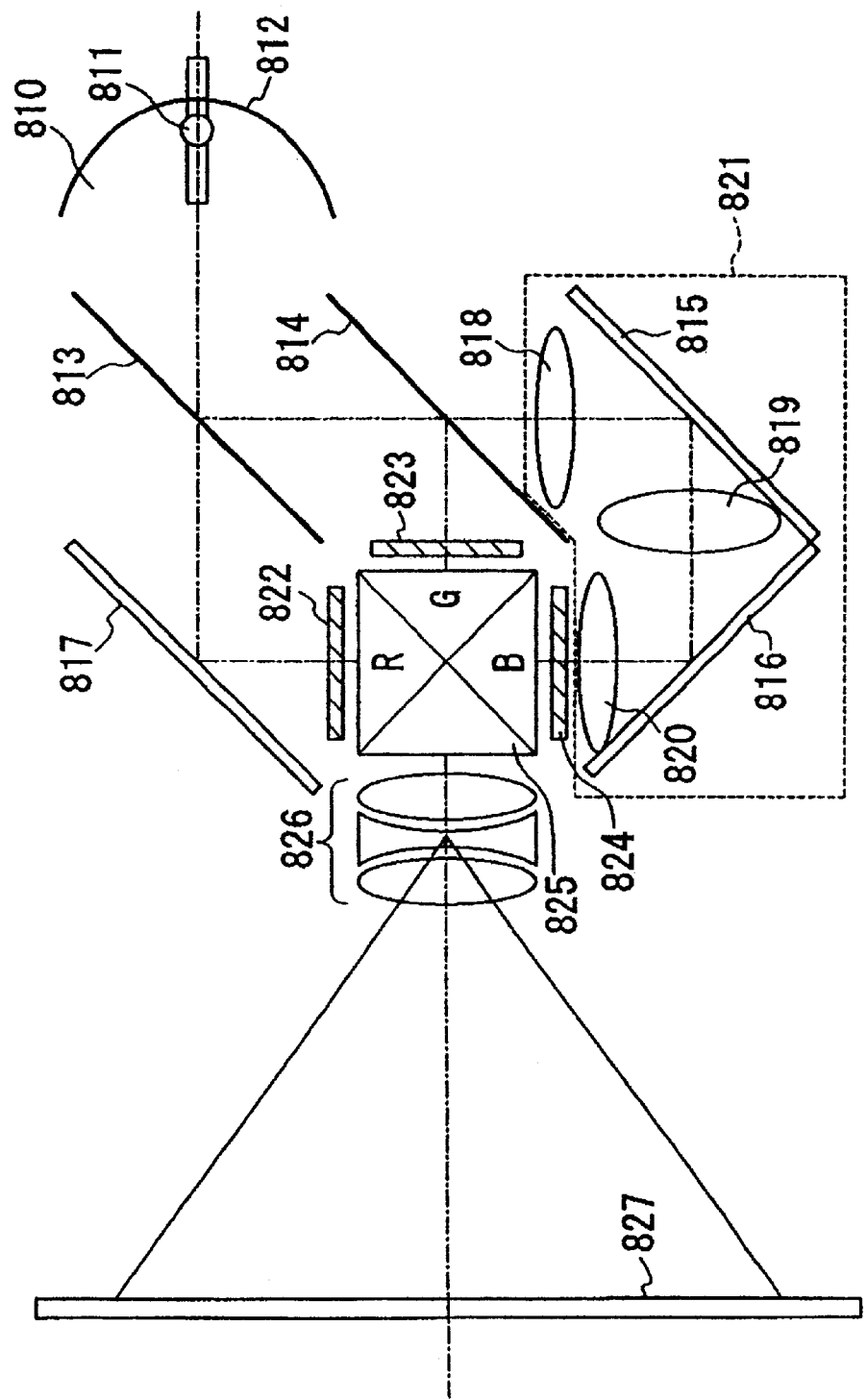
[FIG. 16]

[FIG. 17]
(a)
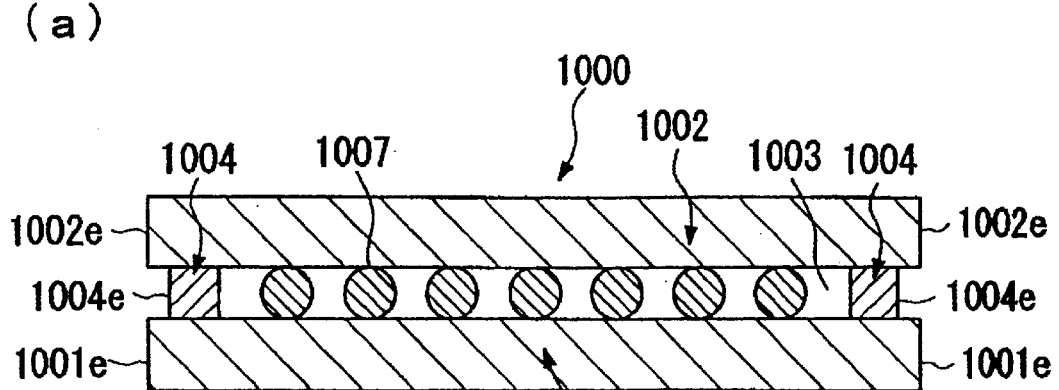
(b)
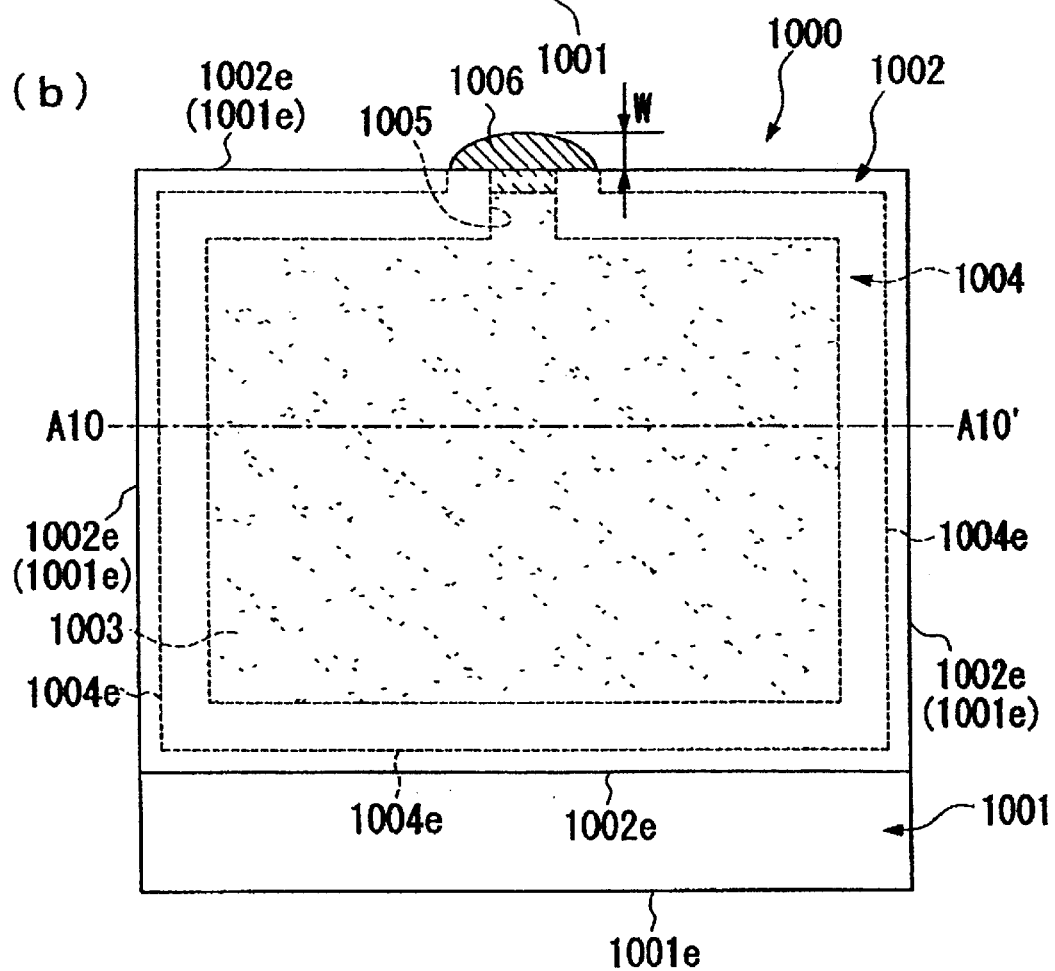

[FIG. 18]
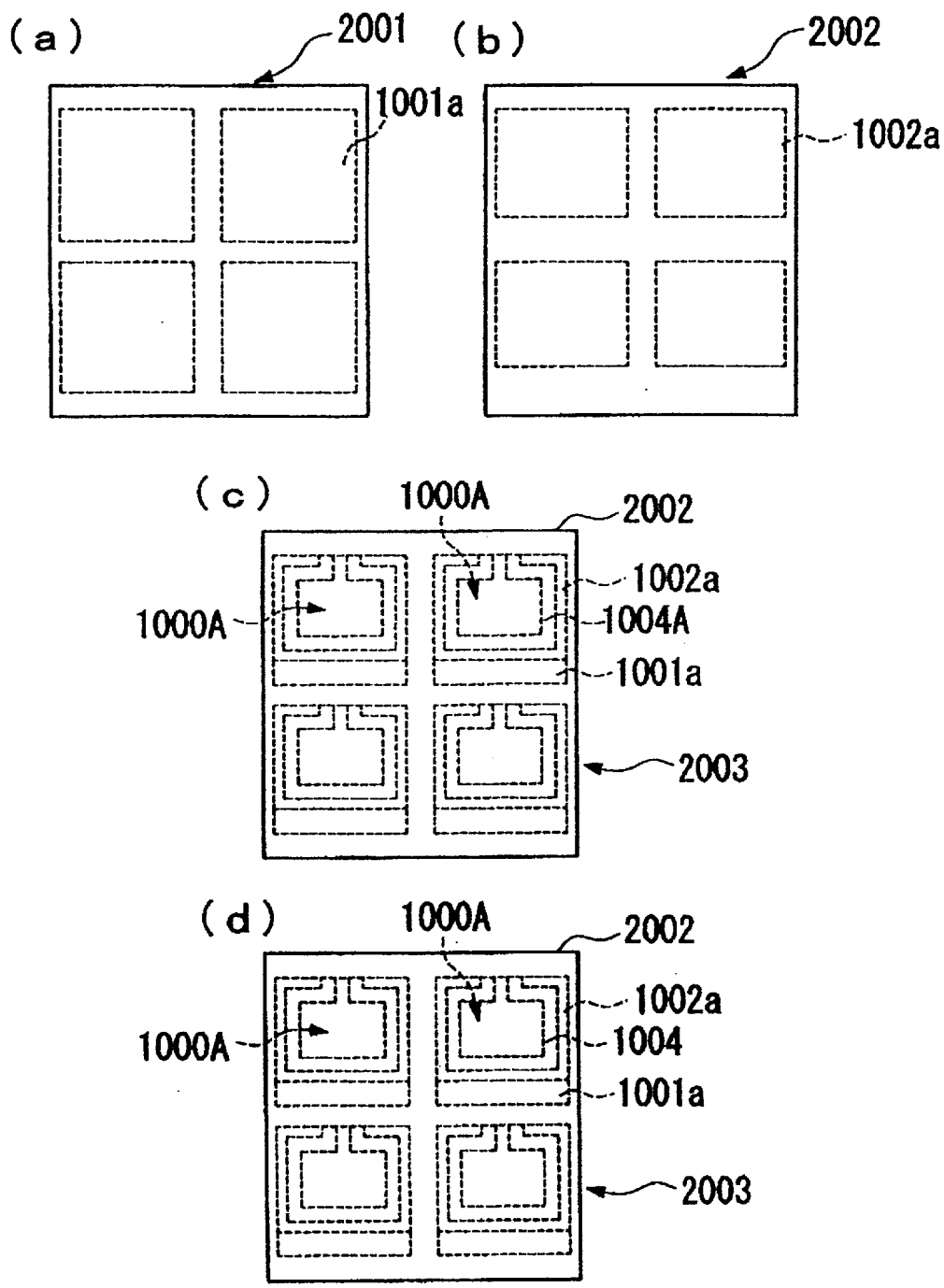

[FIG. 19]
(a)
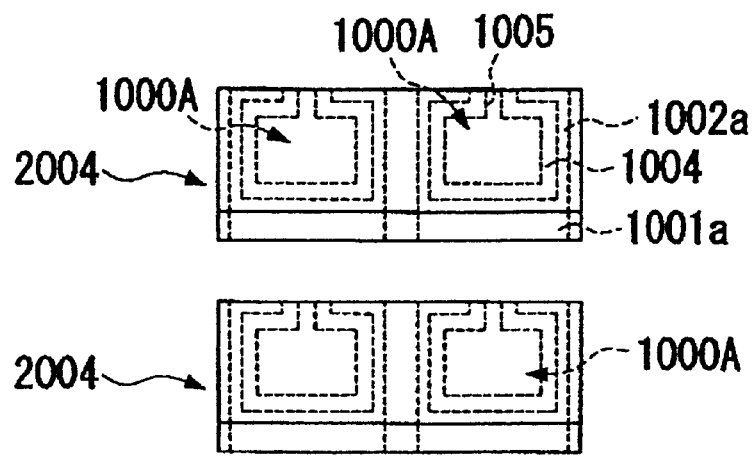
(b)
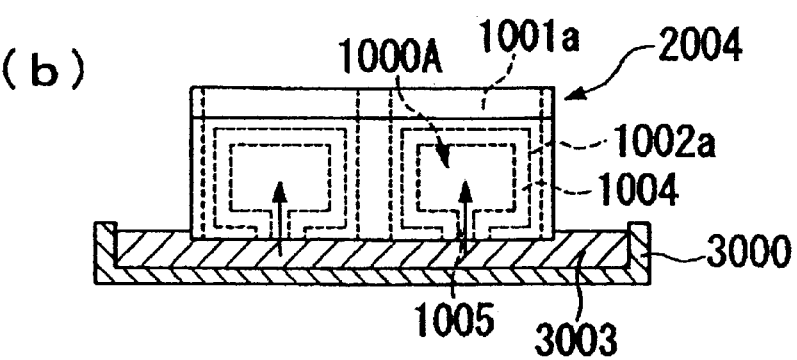
(c)
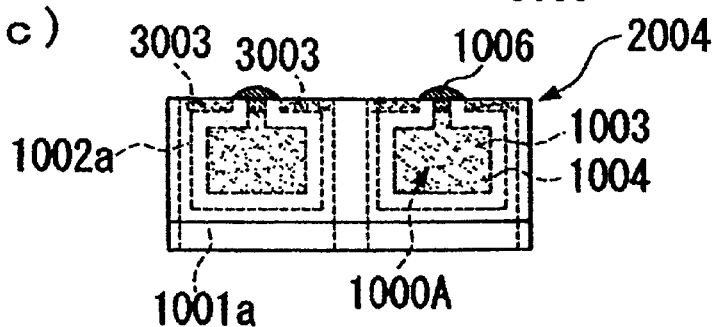
(d)
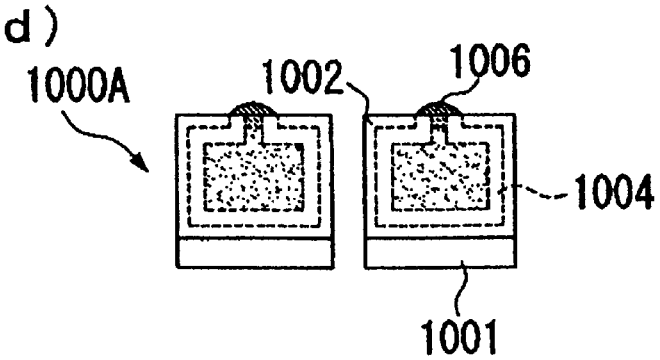

ELECTRO-OPTICAL DEVICE INCLUDING A CONTIGUOUS SEALING MEMBER AND METHOD FOR MANUFACTURING THE SAME

BACKGROUND OF THE INVENTION

1. Field of Invention

The present invention relates to a manufacturing method for manufacturing an electro-optical device, a sealing member compression curing apparatus appropriate for use in the manufacturing method of the electro-optical device, and the electro-optical device, and electronic equipment.

2. Description of Related Art

Currently, electro-optical devices, such as liquid crystal devices, exist and are well known. For example, FIG. 17(a) is a sectional view of a conventional liquid crystal device 1000 taken along a plane that is perpendicular to the surface of each substrate 1001, 1002. In particular, FIG. 17(a) is the sectional view of the liquid crystal device 1000 taken along line A10–A10' in FIG. 17(b). FIG. 17(b) shows a plan view of the liquid crystal device 1000 viewed from the side of an upper substrate. The structure of the liquid crystal display device 1000 is now discussed.

Referring to FIG. 17(a), the liquid crystal device 1000 includes a substrate (a lower substrate) 1001 and a counter substrate (a upper substrate) 1002, both of which are bonded to each other with a predetermined spacing maintained therebetween with a sealing member 1004 glued in the peripheral portions thereof. A liquid crystal layer (an electro-optical material layer) 1003 is encapsulated between the substrate 1001 and the counter substrate 1002. A number of spherical spacers 1007 are arranged in a liquid crystal cell (an electro-optical cell) to maintain a uniform cell gap between the substrate 1001 and the counter substrate 1002.

Referring now to FIG. 17(b), the sealing member 1004 is formed in a loop configuration between the peripheral portions of the substrate 1001 and the counter substrate 1002, and includes an injection port 1005, i.e., an aperture for introducing the liquid crystal (the electro-optical material). Once the liquid crystal (the electro-optical material) is injected between the substrate 1001 and the counter substrate 1002 through the injection port 1005, the injection port 1005 is closed with a sealing material 1006. Referring to FIGS. 17(a) and 17(b), in the liquid crystal display device 1000, the end face 1004e of the sealing member 1004, with the exception of the area immediately adjacent to the injection port 1005, is inset from the end face 1001e of the substrate 1001 and the end face 1002e of the counter substrate 1002.

In accordance with the characteristics of the liquid crystal device 1000, switching elements, electrodes and an alignment layer (not shown) are formed on the surface of the substrate 1001 facing the liquid crystal 1003. A color filter layer, electrodes and an alignment layer (not shown) are formed on the surface of the counter substrate 1002 facing the liquid crystal 1003. Optical members, including a retardation film and a polarizer (not shown) are arranged on the external side of each of the substrate 1001 and the counter substrate 1002.

FIGS. 18(a)–18(d) and FIGS. 19(a)–19(d) are plan views showing the processing steps for producing the liquid crystal device 1000. As shown, to perform volume production and to simplify the manufacturing process, the liquid crystal device 1000 is manufactured using a substrate base material 2001, shown in FIG. 18(a), that is diced into a plurality of the substrates 1001, and a counter substrate base material 2002, shown in FIG. 18(b), which is diced into a plurality of the counter substrates 1002.

Regions of the substrate base material 2001 and the counter substrate base material 2002, respectively, eventually become the substrates 1001 and the counter substrates 1002, and are respectively referred to as a substrate formation region 1001a and a counter substrate formation region 1002a. The number of the substrate formation regions 1001a in the substrate base material 2001 and the number of the counter substrate formation region 1002a in the counter substrate base material 2002 are determined by the areas of the substrate 1001 and the counter substrate 1002 and the areas of the substrate base material 2001 and the counter substrate base material 2002. As shown in the examples of FIGS. 18(a) and 18(b), the substrate base material 2001 includes four substrate formation regions 1001a and the counter substrate base material 2002 includes four counter substrate formation regions 1002a.

The substrate formation region 1001a and the counter substrate formation region 1002a are respectively formed in the predetermined locations in the substrate base material 2001 and the counter substrate base material 2002 so that the substrate formation regions 1001a are respectively opposed to the counter substrate formation regions 1002a when the substrate base material 2001 and the counter substrate base material 2002 are bonded together. Further, while not shown, switching elements, electrodes and an alignment layer that are required for the substrate 1001 can be formed on the surface of each substrate formation region 1001a on the substrate base material 2001, depending on the characteristics of the liquid crystal device 1000. While also not shown, a color filter layer, electrodes, and an alignment layer required for the counter substrate 1002 can also be formed on the surface of each substrate formation region 1002a of the counter substrate base material 2002.

A sealing member 1004A made of a thermosetting epoxy adhesive or a photosetting epoxy adhesive is applied in the peripheral portion of each substrate formation region 1002a of the counter substrate base material 2002. After dispersing spacers 1007 in an area internal to the uncured sealing member 1004A on the counter substrate formation region 1002a, the substrate base material 2001 and the counter substrate base material 2002 are bonded together with the uncured sealing member 1004A interposed therebetween so that the substrate formation regions 1001a are aligned with the respective opposing counter substrate formation regions 1002a. A liquid crystal cell base material (an electro-optical cell base material) 2003 thus results.

FIG. 18(c) is a plan view showing the liquid crystal cell base material 2003 viewed from above the counter substrate base material 2002. FIG. 18(c) shows individual liquid crystal cells (electro-optical material cells) represented by reference numeral 1000A. In this case, the substrate base material 2001 is bonded to the counter substrate base material 2002 in a manner such that the electrodes and the alignment layers formed on the surfaces of the substrate formation region 1001a are respectively correctly aligned with the electrodes and the alignment layers on the counter substrate formation region 1002a.

Referring to FIG. 18(d), the uncured sealing member 1004A of the liquid crystal cell base material 2003 is cured by compression-bonding the entire liquid crystal cell base material 2003 from outside the substrate base material 2001 and from outside the counter substrate base material 2002, thereby forming the sealing member 1004.

Referring to FIG. 19(a), the liquid crystal cell base material 2003 is diced in a manner such that the injection port 1005 for introducing the liquid crystal is positioned along a cutting edge. A plurality of liquid crystal cells (electro-optical material cells) 1000A become a rectangular liquid crystal cell (electro-optical cell base material) 2004 arranged in a horizontal line.

Next, referring to FIG. 19(b), the injection port 1005 of each cell liquid crystal cell 1000A of a liquid crystal cell base material 2004 is positioned into contact with liquid crystal 3003 held in a liquid crystal tray 3000 in the presence of a vacuum. Subsequently, the liquid crystal cell base material 2004 is then returned back into the atmosphere to introduce the liquid crystal into each liquid crystal cell 1000A. Referring to FIG. 19(c), the liquid crystal layer 1003 is thus formed in each liquid crystal cell 1000A of the liquid crystal cell base material 2004. The injection port 1005 is then closed with the sealing material 1006.

Referring to FIG. 19(c), the liquid crystal 3003, after the cell base material 2004 is removed from the liquid crystal 3003 in the liquid crystal tray 3000, the liquid crystal 3003 can remain stuck to the external area of the sealing member 1004 of the liquid crystal cell base material 2004 in this manufacturing process. The liquid crystal 3003 stuck on the external area of the sealing member 1004 of the liquid crystal cell 1000A can be removed by cleaning the liquid crystal cell 1000A.

Referring to FIG. 19(d), the liquid crystal cell base material 2004 is diced along the outline of the substrate formation region 1001a and the counter substrate formation region 1002a. The liquid crystal cell 1000A, i.e., the substrate 1001 and the counter substrate 1002, are thus obtained. Finally, the optical elements, such as the retardation films and the polarizers, are respectively mounted on the external sides of the substrate 1001 and the counter substrate 1002, although these elements are not shown. The liquid crystal device 1000 thus results.

In the above-referenced manufacturing process of the liquid crystal display device 1000, the liquid crystal 3003 is introduced into the liquid crystal cell 1000A by putting the rectangular liquid crystal cell base material 2004 into contact with the liquid crystal 3003 held in the liquid crystal tray 3000 as shown in FIG. 19(b). Referring to FIG. 19(c), the liquid crystal 3003 remains on the external area of the sealing member 1004 of the liquid crystal cell 1000A. For this reason, the liquid crystal cell 1000A must be subjected to a cleaning step subsequent to the dicing of the liquid crystal cell base material 2004 into the liquid crystal cells 1000A. However, the cell gap of the liquid crystal cell 1000A is on the order of $2 \times 10^{-6}$ m to $10 \times "10^{-6}$ m (2 to 10 mm), and the liquid crystal 3003 stuck on the external surface of the sealing member 1004 between the substrate 1001 and the counter substrate 1002 is difficult to remove. A careful cleaning operation is thus required.

The cleaning step of the liquid crystal cell 1000A is now discussed in greater detail.

After immersing the liquid crystal cell 1000A in a cleaning bath filled with a clearing solvent, such as a neutral detergent, the liquid crystal cell 1000A is withdrawn therefrom. The liquid crystal cell 1000A is then immersed in deionized water in a bath at a room temperature. Clearing solvent and the remnant of liquid crystal 3003 stuck on the liquid crystal cell 1000A are partially removed. The liquid crystal cell 1000A is then withdrawn therefrom. This series of steps is repeatedly performed at a plurality of deionized water baths to remove clearing solvent and liquid crystal 3003 from the liquid crystal cell 1000A.

To completely remove clearing solvent and liquid crystal 3003 stuck on the liquid crystal cell 1000A, the liquid crystal cell 1000A is immersed in hot deionized water in a hot deionized water bath. After withdrawing the liquid crystal cell 1000A, the liquid crystal cell 1000A is dried at a temperature of about 1000° C. The liquid crystal cell 1000A is then quickly cooled down to the room temperature. By quickly cooling the liquid crystal cell 1000A down to the room temperature, the liquid crystal cell 1000A is subjected to an isotropic process.

The above-described cleaning process of the liquid crystal cell 1000A includes many steps and can be very time-consuming. Accordingly, the cleaning process can lower the production yield of the liquid crystal device 1000. Further, since an effluent containing liquid crystal 3003 is drained, a disposal process is required. Accordingly, the cleaning process creates and disposal processes must handle a great deal of cleaning solvent and water that can be harmful to the environment.

The liquid crystal device 1000 also has a problem of the sealing material 1006 being outwardly convex therefrom. Referring to FIG. 17(b), the sealing material 1006 has a large thickness in an outwardly convex shape from the end face 1001e (1002e) of the substrate 1001 (the counter substrate 1002). The height W of the sealing material 1006 out of the liquid crystal device 1000 ranges from $0.3 \times 10^{-3}$ m to $0.5 \times 10^{-3}$ m (0.3 to 0.5 mm). Considering the cell gap of the liquid crystal device 1000, namely, the height of the sealing material 1006, ranges from $2 \times 10^{-6}$ m to $10 \times 10^{-6}$ m (2 to 10 mm), the width W of the sealing material 1006 projecting outwardly of the liquid crystal display device 1000 is relatively large. Accordingly, the sealing material 1006 projecting outwardly of the liquid crystal device 1000 can require additional spacing in electronic equipment that incorporates the liquid crystal device 1000.

The above problem is not limited to the liquid crystal device, but also arises in other electro-optical devices such an electroluminescence or a plasma display, having a structure that has a pair of substrates holding an electro-optical material at a predetermined spacing therebetween.

It is an object of the present invention to resolve the above problem and to provide an electro-optical device and a manufacturing method for manufacturing the electro-optical device that does not require the cleaning process of an electro-optical material cell, increases production yield, and saves spacing in electronic equipment which incorporates the electro-optical device.

It is another object of the present invention to provide space-saved electronic equipment with the electro-optical device incorporated.

SUMMARY OF THE INVENTION

To achieve the above objects, a manufacturing method of the present invention for manufacturing an electro-optical device, which includes a sealing member that is formed to bond a pair of opposing substrates that encapsulate an electro-optical layer therebetween, uses a pair of opposing substrate base materials, each of which includes a plurality of substrate formation regions on which the respective substrates are formed. The manufacturing method includes forming an uncured sealing member having no injection port by applying an uncured adhesive in a loop configuration in a peripheral portion of each substrate formation region of one of the pair of substrate base materials. Next, fabricating an electro-optical layer by applying an electro-optical material in the internal area surrounded by the uncured sealing member in each substrate formation region of the substrate base material. Assembling an electro-optical cell base material by bonding the one substrate base material to the other substrate base material with the uncured sealing member interposed therebetween. Curing the uncured sealing member of the electro-optical cell base material. Finally, dicing the electro-optical cell base material along each substrate formation region.

In accordance with the manufacturing method of the present invention, an uncured adhesive is applied in a loop configuration in the peripheral portion of each substrate formation region of one of the pair of substrate base materials to form an uncured sealing member having no injection port. An electro-optical material is applied in the internal area surrounded by the uncured sealing member in each substrate formation region of the substrate base material. Accordingly, the electro-optical material is prevented from being stuck on the external surface of the sealing member. The present invention thus provides the manufacturing method for manufacturing an electro-optical device that eliminates a need for a cleaning process for the electro-optical cell, and results in a high production yield.

In accordance with the manufacturing method of the present invention, the pair of substrate base materials is bonded together after forming the electro-optical layer in each substrate formation region on one of the pair of substrate base materials. The electro-optical cell base material is thus formed, and is then diced into individual electro-optical cells. This method eliminates the need for a step of dicing an electro-optical cell base material into a rectangular electro-optical cell to introduce an electro-optical material in the manufacturing process of conventional electro-optical devices. The manufacturing method of this invention therefore simplifies the manufacturing process of the electro-optical device while increasing production yield thereof.

Since the sealing member has no injection port, the sealing step of applying a sealing material is not required to close an injection port, as in the manufacturing process of the conventional electro-optical device. Accordingly, the manufacturing process of the electro-optical device is thus simplified and the production yield thereof is increased.

The above-referenced manufacturing method can be applied when the electro-optical device is manufactured from the substrate base material. Further, the above-referenced manufacturing method can equally be applied when an electro-optical device is manufactured without using the substrate base material.

In this case, a manufacturing method for manufacturing an electro-optical device, which includes a sealing member that is formed to bond a pair of opposing substrates that encapsulate an electro-optical layer therebetween, includes forming an uncured sealing member having no injection port by applying an uncured adhesive in a loop configuration in a peripheral portion of one of the pair of substrates. Fabricating an electro-optical layer by applying an electro-optical material on the one substrate in the internal area surrounded by the uncured sealing member. Assembling an electro-optical cell by bonding the one substrate to the other substrate with the sealing member interposed therebetween. Curing the uncured sealing member of the electro-optical cell. Like the case in which the substrate base material is used, this manufacturing method for manufacturing an electro-optical device eliminates the need for a cleaning process of the electro-optical cell, and increases the production yield thereof.

In the manufacturing method for manufacturing an electro-optical device, the step of fabricating the electro-optical layer applies the electro-optical material on the one substrate in the internal area surrounded by the uncured sealing member using a dispenser that discharges droplets of the electro-optical material.

An ink-jet nozzle, which precisely applies a small quantity of electro-optical material, can be preferably used for the application of the electro-optical material.

In order to reliably and continuously discharge the electro-optical material without clogging the ink-jet nozzle, the viscosity of the electro-optical material preferably falls within a range from 1 to 50 mPa×s, and more preferably, the viscosity of the electro-optical material falls within a range from 1 to 50 mPa×s. Such viscosities can achieved by, for example, heating the electro-optical material. The application of the electro-optical material is thus performed.

When the electro-optical material is applied, the electro-optical material having a viscosity falling within a range from 1 to 50 mPa×s, more preferably within a range from 1 to 10 mPa×s, is used. Without clogging the ink-jet nozzle, the electro-optical material is reliably and continuously discharge. Since the applied electro-optical material flows and spreads over within the substrate formation region or on the substrate, there is no need for applying droplets of the electro-optical material over the entire internal area surrounded by the uncured sealing member on each substrate formation region or on each substrate. Simply by applying a few droplets of the electro-optical material in the internal area surrounded by the uncured sealing member on each substrate formation region or on each substrate, the electro-optical layer is formed without any void in the entire internal area surrounded by the uncured sealing member on each substrate formation region or on each substrate.

In the manufacturing method of the present invention in order to produce a leak-free sealing member the step of curing the uncured sealing member preferably cures the uncured sealing member by compression-bonding at least an area of one of the electro-optical cell base material and the electro-optical cell, having the uncured sealing member formed therewithin, from outside the one of the electro-optical cell base material and the electro-optical cell. By doing so, the uncured sealing member is efficiently compression-bonded rather than by compressing entirely the one of the electro-optical cell base material and the electro-optical cell. A leak-free sealing member thus results.

Since no technique was conventionally available to pressurize only the area of the electro-optical cell base material or the electro-optical cell having the uncured sealing member formed therewithin, the electro-optical cell base material or the electro-optical cell was entirely pressurized to compression-bond the uncured sealing material. As a result of studies, the inventors of the present invention have developed a sealing member compression curing apparatus which enables the area of the electro-optical cell base material or the electro-optical cell having the uncured sealing member formed therewithin, to be pressurized. Accordingly, with the sealing member compression curing apparatus, only the area of the electro-optical cell base material or the electro-optical cell having the uncured sealing member formed therewithin is pressurized. The sealing member compression curing apparatus of the present invention is discussed in greater detail below.

The inventors have discovered that in the step of curing the uncured sealing member, only an area of one of the electro-optical cell base material and the electro-optical cell, having the uncured sealing member formed therewithin, is cured by discharging gas onto the area of one of the electro-optical cell base material and the electro-optical cell, having the uncured sealing member formed therewithin, from outside the one of the electro-optical cell base material and the electro-optical cell.

When the uncured sealing member is fabricated of a thermosetting adhesive, the step of curing the uncured sealing member preferably cures the uncured sealing member by heating one of the electro-optical cell base material and the electro-optical cell to within a range from 100° C. to 160° C. for a heating time of 30 to 60 minutes. By heating the one of the electro-optical cell base material and the electro-optical cell to within a range from 100° C. to 160° C. for a heating time of 30 to 60 minutes, the uncured sealing member is cured without incurring any damage on the electro-optical material. When the uncured sealing member is fabricated of a thermosetting adhesive, only an area of one of the electro-optical cell base material and the electro-optical cell, having the uncured sealing member formed therewithin, is preferably heated not to damage the electro-optical layer.

Since no technique was conventionally available to heat only the area of the electro-optical cell base material or the electro-optical cell having the uncured sealing member formed therewithin, the electro-optical cell base material or the electro-optical cell was entirely heated to cure the uncured sealing material. As a result of studies, the inventors of this invention have developed a sealing member compression curing apparatus which enables the area of the electro-optical cell base material or the electro-optical cell having the uncured sealing member formed therewithin, to be heated. With the sealing member compression curing apparatus, only the area of the electro-optical cell base material or the electro-optical cell having the uncured sealing member formed therewithin is heated.

When the uncured sealing member, fabricated of a photosetting adhesive, is cured, only an area of one of the electro-optical cell base material and the electro-optical cell, having the uncured sealing member formed therewithin, is preferably irradiated with ultraviolet light. By irradiating, with ultraviolet light, only the area of the one of the electro-optical cell base material and the electro-optical cell, having the uncured sealing member formed therewithin, the electro-optical layer is protected from ultraviolet light. The uncured sealing member is thus cured without damaging the electro-optical layer.

Since no technique was conventionally available to irradiate, with ultraviolet light, only the area of the electro-optical cell base material or the electro-optical cell having the uncured sealing member formed therewithin, the electro-optical cell base material or the electro-optical cell was entirely irradiated with ultraviolet light to cure the uncured sealing material. As a result of studies, the inventors of the present invention have developed a sealing member compression curing apparatus which enables the area of the electro-optical cell base material or the electro-optical cell having the uncured sealing member formed therewithin, to be irradiated with ultraviolet light. With the sealing member compression curing apparatus, only the area of the electro-optical cell base material or the electro-optical cell having the uncured sealing member formed therewithin is irradiated with ultraviolet light.

The sealing member compression curing apparatus of the present invention is now discussed. The sealing member compression curing apparatus of this invention is used not only in the manufacturing process for manufacturing the electro-optical device of this invention, but also in the manufacturing process for manufacturing a conventional electro-optical device. Further, the sealing member compression curing apparatus of this invention is used not only in the manufacturing process for manufacturing the electro-optical device of this invention, but also in the manufacturing method for manufacturing a substrate assembly which is constructed by bonding a pair of opposing substrates with a sealing member interposed therebetween.

A sealing member compression curing apparatus that cures an uncured sealing member of a substrate assembly by compression-bonding the uncured sealing member from outside the substrate assembly after manufacturing the substrate assembly by mutually bonding a pair of opposing substrates with the uncured sealing member made of a thermosetting adhesive and interposed therebetween, includes a heater unit for heating at least an area of the substrate assembly having the uncured sealing member formed therewithin to a predetermined temperature, and a pressurizing unit for pressurizing at least the area of the substrate assembly having the uncured sealing member formed therewithin.

For example, in the sealing member compression curing apparatus of the present invention, the pressurizing unit can be a gas discharge unit for discharging gas to the area of the substrate assembly having the uncured sealing member formed therewithin. In this way, the area of the substrate assembly having the uncured sealing member formed therewithin is pressurized.

The sealing member compression curing apparatus of this invention further includes a pair of platforms opposed to each other with a predetermined spacing maintained therebetween, wherein the pair of platforms forms an internal space in which the substrate assembly is mounted, and wherein at least one of the pair of platforms includes, on the surface thereof facing the internal space, a plurality of gas discharge units which discharges gas to the area of the substrate assembly having the uncured sealing member formed therewithin.

The sealing member compression curing apparatus of this invention further includes a pair of platforms opposed to each other with a predetermined spacing maintained therebetween, wherein the pair of platforms forms an internal space in which the substrate assembly is mounted, and wherein at least one of the pair of platforms is a heater unit which is heated to heat the substrate assembly mounted in the internal space.

The sealing member compression curing apparatus of the present invention can include a heater unit that is an infrared light emitter for emitting infrared light, and an infrared cutoff filter for preventing infrared light from irradiating an area other than the area of the substrate assembly having the uncured sealing member formed therewithin. Infrared light emitted by the infrared light emitter irradiates only the area of the substrate assembly having the uncured sealing member formed therewithin so that only the area of the substrate assembly having the uncured sealing member formed therewithin is heated.

The sealing member compression curing apparatus of the present invention, for example, includes a pair of platforms opposed to each other with a predetermined spacing maintained therebetween, and permitting infrared light to transmit therethrough, and forming an internal space in which the substrate assembly is mounted, wherein at least one infrared light emitter is arranged on the pair of platforms on the external sides thereof, and wherein at least one of the pair of platforms includes an infrared cutoff filter on the internal side or the external side thereof for allowing infrared light from irradiating an area other than the area of the substrate assembly having the uncured sealing member formed therewithin. Infrared light emitted from the infrared light emitter thus irradiates only the area of the substrate assembly having the uncured sealing member formed therewithin.

The sealing member compression curing apparatus, which cures an uncured sealing member of a substrate assembly by compression-bonding the uncured sealing member from outside the substrate assembly after manufacturing the substrate assembly by mutually bonding a pair of opposing substrates with the uncured sealing member made of a photosetting adhesive, and interposed therebetween, includes an ultraviolet light emitter for irradiating, with ultrasonic light, at least an area of the substrate assembly having the uncured sealing member formed therewithin, and a pressurizing unit for pressurizing at least the area of the substrate assembly having the uncured sealing member formed therewithin.

For example, in the sealing member compression curing apparatus of the present invention, the pressurizing unit is a gas discharge unit for discharging a gas to the area of the substrate assembly having the uncured sealing member formed therewithin. In this way, the area of the substrate assembly having the uncured sealing member formed therewithin is pressurized.

The sealing member compression curing apparatus of the present invention further includes a pair of platforms opposed to each other with a predetermined spacing maintained therebetween, wherein the pair of platforms forms an internal space in which the substrate assembly is mounted, and wherein at least one of the pair of platforms includes, on the surface thereof facing the internal space, a plurality of gas discharge units which discharges a gas to the area of the substrate assembly having the uncured sealing member formed therewithin.

The present invention further includes a sealing member compression curing apparatus which includes an ultraviolet cutoff filter for preventing ultraviolet light from irradiating an area other than the area of the substrate assembly having the uncured sealing member formed therewithin. Ultraviolet light emitted from the ultraviolet light emitter irradiates only the area of the substrate assembly having the uncured sealing member formed therewithin.

The sealing member compression curing apparatus of the present invention includes a pair of platforms opposed to each other with a predetermined spacing maintained therebetween, and permitting ultraviolet light to transmit therethrough, and forming an internal space in which the substrate assembly is mounted, wherein at least one ultraviolet light emitter is arranged on the pair of platforms on the external sides thereof, and wherein at least one of the pair of platforms includes an ultraviolet cutoff filter on the internal side or the external side thereof for preventing ultraviolet light from irradiating an area other than the area of the substrate assembly having the uncured sealing member formed therewithin. Ultraviolet light emitted from the ultraviolet light emitter irradiates only the area of the substrate assembly having the uncured sealing member formed therewithin.

An electro-optical device of the present invention includes a pair of substrates encapsulating an electro-optical material therebetween and bonded to each other using a sealing member formed therebetween in accordance with the manufacturing method of the above-referenced electro-optical device, wherein the sealing member is arranged in a loop configuration in peripheral portions of the pair of substrates and has no injection port formed therein.

Since the electro-optical device includes the sealing member having no injection port, there is no sealing material formed for closing an injection port. Therefore, space is saved in electronic equipment incorporating the electro-optical device.

In the electro-optical device produced in accordance with the above-referenced manufacturing method, the external end faces of the sealing member are respectively aligned with the end faces of at least one of the pair of substrates.

In the electro-optical device, the area of the substrate external to the sealing member is narrower than the width of the sealing member, the total area of the substrate is reduced. Further, space is saved in electronic equipment incorporating the electro-optical device. Since the area of the substrate is reduced in the electro-optical device, the substrate base material is effectively used. Accordingly, space-saved electronic equipment results with the above-referenced electro-optical device incorporated.

BRIEF DESCRIPTION OF THE DRAWINGS

This invention is described in conjunction with the following drawings in which like reference numerals refer to like elements, and wherein:

FIG. 1 is a cross-sectional view generally showing the liquid crystal device of a first embodiment of the present invention employing thin-film transistors (TFTs) taken in a plane perpendicular to a substrate of the liquid crystal device;

FIG. 2 is a plan view generally showing the liquid crystal device of the first embodiment of the present invention employing the TFTs viewed from an upper substrate of the liquid crystal device;

FIG. 3 is a cross-sectional view showing the liquid crystal device of the first embodiment of the present invention employing the TFTs with a substrate (a lower substrate) partly shown on a larger scale;

FIGS. 4(a)–4(c) show the manufacturing process of the liquid crystal device of the first embodiment of the present invention employing the TFTs, covering a step of applying a liquid crystal on a counter substrate base material;

FIGS. 5(a)–5(c) show the manufacturing process of the liquid crystal device of the first embodiment of the present invention employing the TFTs, covering steps from bonding a substrate base material to a counter substrate base material to completing the manufacture of the liquid crystal device;

FIG. 6 is a perspective view showing an ink-jet nozzle for use in the fabrication step of the liquid crystal layer in the manufacturing method of the liquid crystal device of the first embodiment of the present invention;

FIG. 7 is a cross-sectional view generally showing the ink-jet nozzle for use in the fabrication step of the liquid crystal layer in the manufacturing method of the liquid crystal device of the first embodiment of the present invention;

FIG. 8 is a cross-sectional view generally showing a sealing member compression curing apparatus appropriate for use in the curing step of a sealing member in the manufacturing method of the liquid crystal device of the first embodiment of the present invention;

FIG. 9 is a cross-sectional view generally showing a sealing member compression curing apparatus appropriate for use in the curing step of a sealing member in the manufacturing method of the liquid crystal device of the first embodiment of the present invention;

FIG. 10 is a cross-sectional view generally showing a sealing member compression curing apparatus for use in the curing step of a sealing member in the manufacturing method of the liquid crystal device of the first embodiment of the present invention;

FIG. 11 is a general cross-sectional view of a liquid crystal device of a second embodiment of the present invention employing TFTs taken in a plane perpendicular to a substrate thereof;

FIG. 12 is a plan view generally showing the liquid crystal device of the second embodiment of the present invention employing the TFTs viewed from the upper substrate thereof, FIGS. 13(a)–13(c) show the manufacturing process of the liquid crystal device of the second embodiment of the present invention employing the TFTs, covering a step of applying a liquid crystal on a counter substrate base material;

FIGS. 14(a)–14(c) show the manufacturing process of the liquid crystal device of the second embodiment of the present invention employing the TFTs, covering steps from bonding a substrate base material to a counter substrate base material to completing the manufacture of the liquid crystal device;

FIGS. 15(a)–15(c) show various electronic devices incorporating the liquid crystal device;

FIG. 16 is a block diagram generally showing a major portion of a projection-type display device incorporating the liquid crystal device in accordance with one of the above embodiments, as a light modulator;

FIG. 17(a) is a general cross-sectional view of a conventional ordinary liquid crystal device taken in a plane perpendicular to the substrate thereof;

FIG. 17(b) is a general plan view of the conventional liquid crystal device viewed from the upper substrate thereof;

FIGS. 18(a)–18(d) show the manufacturing process of the conventional ordinary liquid crystal device covering up to a step of forming a sealing member; and FIGS. 19(a)–19(d) show the manufacturing process of the conventional ordinary liquid crystal device covering steps from the formation of a rectangular liquid crystal cell base material to the completion of the manufacture of a liquid crystal cell.

DETAILED DESCRIPTION OF PREFERRED EMBODIMENTS

FIG. 1 is a schematic sectional view of a liquid crystal device (an electro-optical device) 1 of a first embodiment of the present invention using a TFT (Thin-Film Transistor) as a switching element, taken along a plane perpendicular to the surface of each substrate. FIG. 2 is a schematic plan view of the liquid crystal device 1 viewed from an upper substrate thereof. FIG. 3 is a partially enlarged sectional view of a (lower) substrate 11 of the liquid crystal display device 1. FIG. 1 and FIG. 3 are sectional views of the liquid crystal device 1 in FIG. 2 taken along line A1–A1'. Referring to FIGS. 1 through 3, layers and members are not necessarily consistently drawn to scale for easy identification.

The general construction of the liquid crystal display device 1 is first discussed, referring to FIG. 1 and FIG. 2. In FIG. 1, the (lower) substrate 11 and the counter (upper) substrate 12 are bonded together with a sealing member 14 in a loop configuration interposed therebetween with a predetermined gap maintained therebetween. A liquid crystal layer (an electro-optical layer) 13 is encapsulated between the substrate 11 and the counter substrate 12. The sealing member 14 is fabricated of a thermosetting epoxy adhesive or a photosetting epoxy adhesive. In view of the spacing between the substrate 11 and the counter substrate 12, glass fiber particles having a diameter within a range from $2 \times 10^{-6}$ to $10 \times 10^{-6}$ m (2 to 10 mm), although not shown in FIG. 1, can be contained in the sealing member 14 to keep uniform the cell gap of a liquid crystal cell (an electro-optical cell). Further, optical elements, such as a polarizer and a retardation film, can be attached on the external surface of each of the substrate 11 and the counter substrate 12, though these are not shown in FIG. 1.

Referring to FIG. 1, on the top surface of the substrate 11 (facing the liquid crystal layer 13), a number of pixel electrodes 15 and a plurality of TFTs 10 (not shown in FIG. 1) to be discussed later for switching the respective pixel electrodes 15 are formed in the internal area of the sealing member 14 (the area to the right of the sealing member 14 as shown). An alignment layer 18 for aligning the liquid crystal layer 13 in a predetermined direction is arranged on the pixel electrodes 15 and the TFTs 10 on the sides thereof facing the liquid crystal layer 13.

On an opposing surface, a color filter layer 16 having red (R), green (G), and blue (B) color pixels 16a and a light shield layer (a black matrix) 16b, a common electrode 17, and an alignment layer 19 are successively laminated on the underside of the counter substrate 12 (facing the side of the liquid crystal layer 13). In the inner surface of the counter substrate 12, the color filter layer 16 and the alignment layer 19 are formed only internal to the sealing member 14, while the common electrode 17 is fully coextensive with the inner surface of the counter substrate 12. A number of spacers 43 are arranged between the alignment layers 18 and 19 to keep a uniform cell gap of the liquid crystal cell.

Referring to FIG. 2, the substrate 11 and the counter substrate 12 have the same width dimension thereacross but have different vertical dimensions in this embodiment. The vertical dimension of the substrate 11 is larger than the vertical dimension of the counter substrate 12.

As shown in FIG. 2, in this embodiment, the sealing member 14, having a rectangular loop, extends along the four sides of the substrate 11 and the counter substrate 12 between the respective peripheral portions of the substrate 11 and the counter substrate 12. As shown, the sealing member 14 has no injection port through which the liquid crystal would be introduced into the sealing member 14. Referring to FIG. 1 and FIG. 2, the external end faces 14e of the sealing member 14 are slightly inset from the end faces 11e of the substrate 11 and the end faces 12e of the counter substrate 12.

Referring to FIG. 3, the surface structure of the substrate 11 is detailed. The substrate 11 bearing the pixel electrodes 15 and the TFTs 10 formed thereon is an active-matrix substrate having built-in drivers. Three types of TFTs, including the TFT 10 for switching the pixel electrode 15, are formed on the active-matrix substrate.

Arranged from the right to the left as shown in FIG. 3 are an N-type pixel switching TFT 10 having an LDD (Lightly Doped Drain) structure, an N-type driver TFT 20 having an LDD structure, and a P-type driver TFT 30 having a self-alignment structure. In this embodiment, a first conductive type is of an N-type and a second conductive type is of a P-type. FIG. 3 does not show the alignment layer 18 for simplicity.

Referring to FIG. 3, an underlying protective layer 40, fabricated of silicon oxide, is deposited on the surface of the substrate 11 to the side of the liquid crystal layer 13. The N-type pixel switching TFT 10, the N-type driver TFT 20, and the P-type driver TFT 30 formed on the substrate 11 respectively have channel formation regions 27, 28, and 29 respectively between source and drain regions 21 and 22, between source and drain regions 23 and 24, and between source and drain regions 25 and 26. When these channel formation regions 27, 28, and 29 have a channel doped with low density boron ions, these are formed as low density P-type region with an impurity density of about $1 \times 10^{23}$ m$^{-3}$. If a channel dope is performed in this way, the threshold voltages of the N-type driver TFT 20 and the P-type driver TFT 30 are set to be a desired value.

The N-type pixel switching TFT 10, the N-type driver TFT 20, and the P-type driver TFT 30 respectively have gate electrodes 32, 33, and 34 facing a gate insulator 31 (a silicon oxide film having a thickness preferably falling within a range from 30 to 200 nm, and more preferably approximately 100 nm) respectively over the channel formation regions 27, 28, and 29.

The source and drain regions of the N-type pixel switching TFT 10 and the N-type driver TFT 20 are formed of an LDD structure. The source and drain regions 21, 22, 23, and 24 respectively have lightly doped source and drain regions 21A, 22A, 23A, and 24A having an impurity density of about $1 \times 10^{24}$ m$^{-3}$ facing the gate insulator 31 at the ends of the gate electrodes 32 and 33. The source and drain regions 21, 22, 23, and 24 of the N-type pixel switching TFT 10 and the N-type driver TFT 20, except the lightly doped source and drain regions 21A, 22A, 23A, and 24A, are heavily doped source and drain regions 21B, 22B, 23B, and 24B having an impurity density of about $1 \times 10^{26}$ m$^{-3}$. In the P-type driver TFT 30, the entire source and drain regions 25 and 26 are heavily doped regions having an impurity density of about $1 \times 10^{26}$ m$^{-3}$. Source and drain electrodes 35, 36, 37, 38, and 39 of scanning lines and data lines are respectively electrically connected to these heavily doped source and drain regions 21B, 22B, 23B, 24B, 25, and 26 through respective contact holes formed in a lower interlayer insulator 41 and an upper interlayer insulator 42. A pixel electrode 15 is formed on the contact hole in the upper interlayer insulator 42.

The manufacturing method for manufacturing the electro-optical device of this embodiment is now discussed in conjunction with the above-referenced liquid crystal device 1. FIGS. 4(a)–4(c) and FIGS. 5(a)–5(c) illustrate the manufacturing process of the liquid crystal device 1. The manufacturing method of the liquid crystal display device 1 is now discussed. FIGS. 4(a)–4(c) and FIGS. 5(a)–5(c) are diagrammatic plan views.

To perform mass production and to simplify the manufacturing process, the liquid crystal device 1 is manufactured using a substrate base material 111A shown in FIG. 4(a), which is diced into a plurality of the substrates 11, and a counter substrate base material 112A shown in FIG. 4(b), which is diced into a plurality of the counter substrates 12.

Regions of the substrate base material 111A and the counter substrate base material 112A, respectively becoming the substrates 11 and the counter substrates 12, are respectively referred to as a substrate formation region 11a and a substrate formation region 12a. The number of the substrate formation regions 11a in the substrate base material 111A and the number of the substrate formation regions 12a in the counter substrate base material 112A are determined by the areas of the substrate 11 and the counter substrate 12 and the areas of the substrate base material 111A and the counter substrate base material 112A. Referring to FIGS. 4(a) and 4(b), the substrate base material 111A includes six substrate formation regions 11a and the counter substrate base material 112A includes six substrate formation regions 12a. It is to be understood that the present invention is not limited to the number and the layout of the substrate formation regions 11a and substrate formation regions 12a shown in FIGS. 4(a) and 4(b), and that any number of substrate formation regions 11a and 12a may be used without departing from the spirit and scope of the present invention.

The substrate formation region 11a and the substrate formation region 12a are respectively formed in the predetermined locations in the substrate base material 111A and the counter substrate base material 112A so that the substrate formation regions 11a are aligned with the counter substrate formation regions 12a when the substrate base material 111A and the counter substrate base material 112A are bonded together.

The pixel electrodes 15, the TFTs 10, the alignment layer 18, etc., required for the substrate 11 are formed on the surface of each substrate formation region 11a of the substrate base material 111A, although these components are not shown. The color filter layer 16, the common electrode 17, and the alignment layer 18 required for the counter substrate 12 are formed on the surface of each counter substrate formation region 12a of the counter substrate base material 112A, although these components are not shown.

A thermosetting epoxy adhesive or a photosetting epoxy adhesive is applied in a loop configuration in the peripheral portion of each substrate formation region 12a of the counter substrate base material 112A. A sealing member 14A having no injection port is thus formed. The spacers 43, although not shown, are dispersed in the counter substrate formation region 12a.

In FIG. 4(c), in the presence of a vacuum, the liquid crystal (the electro-optical material) is applied in the internal region surrounded by the uncured sealing member 14A in each substrate formation region 12a on the surface of the counter substrate base material 112A. The liquid crystal layer 13 is thus formed. The method of forming the liquid crystal layer 13 in each counter substrate formation region 12a of the counter substrate base material 112A will be discussed in greater detail below.

In a vacuum, the substrate base material 111A and the counter substrate base material 112A are bonded together with the uncured sealing member 14A interposed therebetween so that the substrate formation regions 11a are opposed to the respective counter substrate formation regions 12a. As shown in FIG. 5(a), a liquid crystal cell base material (an electro-optical cell base material) 113A thus results. In this case, the substrate base material 111A and the counter substrate base material 112A must be bonded together so that the alignment layer 18 formed on the substrate formation region 11a is opposed in alignment with the alignment layer 19 formed on the counter substrate formation region 12a. FIG. 5(a) is a plan view showing the liquid crystal cell base material 113A viewed from the side of the counter substrate base material 112A.

Referring to FIG. 5(a), the liquid crystal cell base material 113A includes the substrate formation regions 11a and the respective counter substrate formation regions 12a bonded together with the sealing member 14A interposed therebetween, thereby including six liquid crystal cells (six electro-optical cells) 1A, each composed of one substrate formation region 11a and one substrate formation region 12a with the liquid crystal layer 13 encapsulated therebetween.

Referring to FIG. 5(b), the uncured sealing member 14A is cured in each liquid crystal cell 1A in the liquid crystal cell base material 113A. Finally, the sealing member 14A is formed. The method of curing the uncured sealing member 14A is discussed in greater detail below.

Referring to FIG. 5(c), by dicing the liquid crystal cell base material 113A along the outline of each substrate formation region 11a and each counter substrate formation region 12a, individual liquid crystal cells 1A are formed. The substrate 11 and the counter substrate 12 are formed. The liquid crystal layer 13 is then subjected to an isotropic process. The optical elements, such as a retardation film and a polarizer, are mounted on the external surface of each of the substrate 11 and the counter substrate 12. The liquid crystal display device 1 thus results.

The formation of the liquid crystal layer 13 in the manufacturing method of the liquid crystal device 1 is now detailed.

Referring to FIG. 4(c), the uncured sealing member 14A is applied in the peripheral portion of the counter substrate formation region 12a of the counter substrate base material 112A. In vacuum, the liquid crystal is applied in the internal area surrounded by the uncured sealing member 14A in each counter substrate formation region 12a of the counter substrate base material 112A. The liquid crystal layer 13 is thus formed.

In this embodiment, a dispenser or an inkjet nozzle, capable of discharging droplets of the liquid crystal (the electro-optical material), can be used to apply the liquid crystal in each counter substrate formation region 12a in the counter substrate base material 112A. In this case, preferably, the quantity of the applied liquid crystal substantially equals a volume that is obtained by subtracting the total volume of the spacers 43 from the internal volume enclosed by the substrate 11, the counter substrate 12, and the sealing member 14.

For example, when the liquid crystal panel having a cell gap of $3 \times 10^{-6}$ m (3 mm) thick, $10 \times 10^{-3}$ m (150 mm) high and $150 \times 10^{-3}$ m (150 mm) wide is produced, the volume of the liquid crystal applied in each counter substrate formation region 12a is as small as about $5 \times 10^{-8}$ m$^3$ ($5 \times 10$ mm$^3$). Liquid crystal panels are available in a variety of sizes, and mobile telephones typically employ small liquid crystal panels of $2 \times 10^{-3}$ m to $3 \times 10^{-3}$ m (2 to 3 cm) high and $2 \times 10^{-3}$ m to $3 \times 10^{-3}$ m (2 to 3 cm) wide. The quantity of the liquid crystal applied in each counter substrate formation region 12a in such a small liquid crystal panel becomes even smaller.

Preferably, the ink-jet application method is adopted to discharge and apply a small quantity of liquid crystal in each substrate formation region 12a with high accuracy. The application of the liquid crystal is thus performed with the ink-jet nozzle capable of controlling the amount of discharge in fine steps.

Referring to FIG. 6 and FIG. 7, there is shown a preferred ink-jet nozzle 50 used in a formation step of the liquid crystal layer 13. In FIG. 6, the ink-jet nozzle 50 includes a stainless steel nozzle plate 51 and a vibrator 52. Both the nozzle plate 51 and the vibrator 52 are attached to each other with a partition member (a reservoir plate) 53. A plurality of spaces 54 and a reservoir 55 are defined by the partition member 53 between the nozzle plate 51 and the vibrator 52. The spaces 54 and the reservoir 55 are filled with the liquid crystal. Each of the spaces 54 communicates with the reservoir 55 via each supply passage 56. The nozzle plate 51 is provided with a nozzle aperture 57 for discharging the liquid crystal from the space 54. The vibrator 52 is provided with a hole 58 through which the liquid crystal is fed to the reservoir 55.

Referring to FIG. 7, a piezoelectric element 59 is mounted on the surface of the vibrator 52 opposed to the surface thereof facing the space 54. The piezoelectric element 59 is interposed between a pair of electrodes 60. When the electrodes 60 are supplied with a voltage, the piezoelectric element 59 is outwardly curved, causing the vibrator 52 to outwardly curve or deform integrally with the piezoelectric element 59. Accordingly, the volume of the space 54 increases. An amount of liquid crystal equal to an increase in the volume flows into the space 54 from the reservoir 55 through the supply passage 56. At the moment the voltage to the piezoelectric element 59 is cut off, the piezoelectric element 59 and the vibrator 52 restore back to the initial shapes thereof. The space 54 is also restored to the original volume thereof, thereby resulting in an increase in pressure of the liquid crystal within the space 54. The pressure increase can cause a droplet 61 of the liquid crystal to be discharged through the nozzle aperture 57 toward the counter substrate base material 112A.

To allow the ink-jet nozzle 50 to reliably and continually discharge the droplet 61 of the liquid crystal without closing the ink-jet nozzle 50 in this embodiment, the viscosity of the liquid crystal preferably falls within a range from 1 to 50 mPa×s. More preferably, the ink-jet nozzle 50 is heated to heat the liquid crystal so that the liquid crystal droplet 61 at a viscosity within a range from 1 to 10 mPa×s is discharged.

Using the liquid crystal having a viscosity falling within a range from 1 to 50 mPa×s, more preferably, within a range from 1 to 10 mPa×s, the liquid crystal applied in each counter substrate formation region 12a flows and spreads. There is no need for applying many droplets 61 of the liquid crystal entirely over the internal area surrounded by the uncured sealing member 14A of each counter substrate formation region 12a. It suffices to apply one drop 61 or several drops 61 at localized points in the internal area surrounded by the uncured sealing member 14A of each counter substrate formation region 12a. The liquid crystal layer 13 is thus formed in the internal area surrounded by the sealing member 14A in each substrate formation region 12a without any void left.

The curing of the uncured sealing member 14A in the manufacturing method of the liquid crystal display device 1 is now detailed.

Referring to FIG. 5(a), in a vacuum, the substrate base material 111A and the counter substrate base material 112A are bonded together with the uncured sealing member 14A interposed therebetween to produce the liquid crystal cell base material 113A. The liquid crystal cell base material 113A is withdrawn from the vacuum state, and is put into the atmospheric pressure. Since the internal space in each liquid crystal cell 1A in the liquid crystal cell base material 113A is in vacuum state, the liquid crystal cell 1A is under the atmospheric pressure. To create a leak-free sealing member 14A, the uncured sealing member 14A is preferably cured by compression-bonding the internal area surrounded by the sealing member 14A in the liquid crystal cell base material 113A with a pressure at least as high as the atmospheric pressure from outside the liquid crystal cell base material 113A. To form a leak-free sealing member 14A, in particular, only the area of the liquid crystal cell base material 113A having the sealing member 14A formed therewithin is preferably pressurized.

Because the liquid crystal layer 13 is formed inside each liquid crystal cell 1A of the liquid crystal cell base material 113A in this embodiment, the uncured sealing member 14A is preferably cured under conditions that the liquid crystal layer 13 is free from any damage.

The compression curing of the uncured sealing member 14A is now discussed when the uncured sealing member 14 is fabricated of a thermosetting epoxy adhesive.

In this embodiment, the uncured sealing member 14A, fabricated of a thermosetting adhesive, is compression-cured using a sealing member compression curing apparatus. The sealing member compression curing apparatus includes a heater unit for heating, to a predetermined temperature, at least the area of the liquid crystal cell base material 113A having the uncured sealing member 14A formed therewithin, and a pressurizing unit for pressurizing at least the area of the liquid crystal cell base material 113A having the uncured sealing member 14A formed therewithin. In particular, to form a leak-free sealing member 14A, the sealing member compression curing apparatus to be used preferably includes a pressurizing unit for pressurizing only the area of the liquid crystal cell base material 113A having the uncured sealing member 14A formed therewithin.

FIG. 8 shows a sealing member compression curing apparatus 70 which pressurizes only the area of the liquid crystal cell base material 113A having the uncured sealing member 14A formed therewithin, and which is appropriate for use in the compression curing step of the uncured sealing member 14A fabricated of a thermosetting adhesive. The construction of the sealing member compression curing apparatus 70 and the compression curing of the uncured sealing member 14A are now discussed.

FIG. 8 shows the sealing member compression curing apparatus 70 in which the liquid crystal cell base material 113A shown in FIG. 5(a) is placed. As shown, layers and members are not necessarily consistently drawn to scale for easy identification.

As shown in FIG. 8, the sealing member compression curing apparatus 70 is chiefly composed of a pair of platforms 71A and 71B opposed to each other with a predetermined spacing maintained therebetween. The liquid crystal cell base material 113A is placed in a space 72 defined by the platforms 71A and 71B to cure the uncured sealing member 14A.

At least one of the pair of platforms 71A and 71B has a structure that permits itself to be heated to a predetermined temperature. Now, the two platforms 71A and 71B have a structure that permits themselves to be heated. With the platforms 71A and 71B heating themselves, the platforms 71A and 71B function as a heater unit, thereby heating the space 72 therebetween to a predetermined temperature. As shown in FIG. 8, the spacing between the platforms 71A and 71B is set to be wider than the thickness of the liquid crystal cell base material 113A.

Referring to FIG. 8, the platforms 71A and 71B have a plurality of gas passages 74 running in parallel to the surfaces thereof. The gas passages 74 communicate with gas supplies (not shown) that are arranged on both sides of the sealing member compression curing apparatus 70. In the platforms 71A and 71B, the gas passages 74 are connected to a plurality of gas passages 75 that run toward the space 72 in perpendicular to the gas passages 74. The gas passages 75 are opened to the space 72 at the surfaces of the platforms 71A and 71B. The openings of the gas passages 75 are referred to as a gas discharge unit 73 (a pressurizing unit).

A gas, such as air or nitrogen gas, supplied by the gas supplies is guided from both sides to the gas passages 74, from the gas passages 74 to the gas passages 75, from the gas discharge unit 73 to the space 72 at a predetermined pressure.

The liquid crystal cell base material 113A is placed as shown in FIG. 8 in this embodiment. To pressurize only the area of the liquid crystal cell base material 113A having the uncured sealing member 14A formed therewithin, the gas passages 75 and the gas discharge unit 73 are arranged at locations on the surfaces of the platforms 71A and 71B in alignment with the area of the liquid crystal cell base material 113A having the uncured sealing member 14A formed therewithin. Accordingly, the gas discharge unit 73 continuously discharges the gas at a predetermined pressure to only the area of the liquid crystal cell base material 113A having the uncured sealing member 14A formed therewithin.

Since the gas discharge unit 73 is arranged on the surface of each of the platforms 71A and 71B, the area of the liquid crystal cell base material 113A having the uncured sealing member 14A formed therewithin is under pressure with the gas discharged from the top and bottom gas discharge units 73. The uncured sealing member 14A is compression-bonded. As shown in FIG. 8, the liquid crystal cell base material 113A is lifted. Optionally, the liquid crystal cell base material 113A may be beforehand fixed so that the liquid crystal cell base material 113A is spaced from the surfaces of the platforms 71A and 71B by predetermined spacings. To produce a leak-free sealing member 14A, the area of the liquid crystal cell base material 113A having the uncured sealing member 14A formed therewithin may be pressurized under a pressure of 0.05 MPa.

The platforms 71A and 71B are heated to heat the space 72 to a predetermined temperature with the uncured sealing member 14A under pressure. The uncured sealing member 14A is cured in this way.

The uncured sealing member 14A must be cured while keeping the liquid crystal layer 13 free from any damage. To this end, the uncured sealing member 14A is preferably heated to within a range from 100° C. to 160° C. for a heating time from 30 to 60 minutes.

Using the sealing member compression curing apparatus 70, only the area of the liquid crystal cell base material 113A having the uncured sealing member 14A formed therewithin is pressurized while the liquid crystal cell base material 113A is heated at the same time. Only the uncured sealing member 14A is efficiently compression-bonded, thereby leading to a leak-free sealing member 14. The liquid crystal layer 13 is prevented from being damaged by heating the uncured sealing member 14A to within a range from 100° C. to 160° C. for a heating time from 30 to 60 minutes.

As described above, both platforms 71A and 71B have the gas discharge units 73 in the sealing member compression curing apparatus 70. However, the present invention is not limited to this arrangement. It is perfectly acceptable if at least one of the platforms 71A and 71B is equipped with the gas discharge unit 73 on the surface thereof.

The sealing member compression curing apparatus 70 cures the uncured sealing member 14A with the entire liquid crystal cell base material 113A heated. Only the area of the liquid crystal cell base material 113A having the uncured sealing member 14A formed therewithin is preferably heated in order not to damage the liquid crystal layer 13.

FIG. 9 is a cross-sectional view of another sealing member compression curing apparatus 80 appropriate for use in the compression curing of the uncured sealing member 14A fabricated of a thermosetting adhesive. The sealing member compression curing apparatus 80 pressurizes only the liquid crystal cell base material 113A having the uncured sealing member 14A formed therewithin and heats only the liquid crystal cell base material 113A having the uncured sealing member 14A formed therewithin. The construction of the sealing member compression curing apparatus 80 and the compression curing of the uncured sealing member 14A are now discussed.

FIG. 9 shows the sealing member compression curing apparatus 80 in which the liquid crystal cell base material 113A shown in FIG. 5(a) is placed. As shown, layers and members are not necessarily consistently drawn to scale for easy identification.

Referring to FIG. 9, the sealing member compression curing apparatus 80 is chiefly composed of a pair of opposing platforms 81A and 81B with a predetermined spacing kept therebetween, and an infrared light emitter (a heater unit) 83 for emitting infrared light, including at least one infrared lamp mounted external to the platforms 81A and 81B. The liquid crystal cell base material 113A is placed at a predetermined location in a space 87 formed between the platforms 81A and 81B to cure the uncured sealing member 14A. As shown in FIG. 9, the infrared light emitter 83 is arranged external to each of the platforms 81A and 81B.

The platforms 81A and 81B are fabricated of a transparent material such as glass, and transmit infrared light. The infrared light emitter 83 has, on the external side thereof, a reflective mirror 84 having an inwardly looking concave surface 84a, to efficiently irradiate the platforms 81A and 81B with infrared light. As shown in FIG. 9, the spacing between the platforms 81A and 81B is set to be larger than the thickness of the liquid crystal cell base material 113A.

Referring to FIG. 9, the platforms 81A and 81B internally have a plurality of gas passages 86 running in parallel to the surfaces thereof. The gas passages 86 communicate with gas supplies (not shown) that are arranged on both sides of the sealing member compression curing apparatus 80. In the platforms 81A and 81B, the gas passages 86 are connected to a plurality of gas passages 88 that run toward the space 87 in perpendicular to the gas passages 86. The gas passages 88 are opened to the space 87 at the surfaces of the platforms 81A and 81B. The openings of the gas passages 88 are referred to as a gas discharge unit 85 (a pressurizing unit).

A gas such as air or nitrogen gas supplied by the unshown gas supplies is guided from both sides to the gas passages 86, from the gas passages 86 to the gas passages 88, from the gas discharge unit 85 to the space 87 at a predetermined pressure.

The liquid crystal cell base material 113A is placed as shown in FIG. 9 in this embodiment. To pressurize only the area of the liquid crystal cell base material 113A having the uncured sealing member 14A formed therewithin, the gas passages 88 and the gas discharge unit 85 are arranged at locations inside and on the surfaces of the platforms 81A and 81B in alignment with the area of the liquid crystal cell base material 113A having the uncured sealing member 14A formed therewithin. This arrangement is similar to that in the gas passages 75 and the gas discharge unit 73 in the sealing member compression curing apparatus 70. The gas discharge unit 85 thus continuously discharges the gas at a predetermined pressure to only the area of the liquid crystal cell base material 113A having the uncured sealing member 14A formed therewithin.

Since the gas discharge unit 85 is arranged on the surface of each of the platforms 81A and 81B, the area of the liquid crystal cell base material 113A having the uncured sealing member 14A formed therewithin is under pressure with the gas discharged from the top and bottom gas discharge units 85. The uncured sealing member 14A is compression-bonded. As shown in FIG. 9, the liquid crystal cell base material 113A is lifted. Optionally, the liquid crystal cell base material 113A may be beforehand fixed so that the liquid crystal cell base material 113A is spaced from the surfaces of the platforms 81A and 81B by predetermined spacings. To produce a leak-free sealing member 14A, the area of the liquid crystal cell base material 113A having the uncured sealing member 14A formed therewithin may be pressurized under a pressure of 0.05 MPa.

An infrared light cutoff filter 82 is preferably arranged on each of the platforms 81A and 81B in the surfaces facing the space 87, other than the area of the gas discharge unit 85. When the infrared light emitter 83 emits infrared light with the uncured sealing member 14A pressurized, infrared light is transmitted through the platforms 81A and 81B except for the area having the infrared light cutoff filter 82. In this arrangement, only the area of the liquid crystal cell base material 113A having the uncured sealing member 14A formed therewithin is irradiated with infrared light and only the area of the liquid crystal cell base material 113A having the uncured sealing member 14A formed therewithin is thus heated. The heating temperature of the uncured sealing member 14A is controlled by adjusting the strength of the infrared light emitted by the infrared light emitter 83.

When the sealing member compression curing apparatus 80 is employed, the liquid crystal layer 13 is not heated. The heating temperature and heating time of the uncured sealing member 14A are not limited. The uncured sealing member 14A may be thus subjected to a temperature range within which the uncured sealing member 14A is curable, for example, within a temperature range of 100 to 160° C.

Using the sealing member compression curing apparatus 80, only the area of the liquid crystal cell base material 113A having the uncured sealing member 14A formed therewithin is pressurized while only the area of the liquid crystal cell base material 113A having the uncured sealing member 14A formed therewithin is heated. The uncured sealing member 14A is efficiently compression-bonded, thereby leading to a leak-free sealing member 14. The uncured sealing member 14A is cured without damaging the liquid crystal layer 13.

In the above discussion, both platforms 81A and 81B have the gas discharge units 85 in the sealing member compression curing apparatus 80. However, it is to be understood that the present invention is not limited to this arrangement. It is perfectly acceptable if at least one of the platforms 81A and 81B is equipped with the gas discharge unit 85 on the surface thereof.

The sealing member compression curing apparatus 80 includes the infrared light cutoff filter 82 on the side of each of the platforms 81A and 81B facing the space 87. However, it is to be understood that the present invention is not limited to this arrangement. The infrared light cutoff filter 82 may be arranged inside the platforms 81A and 81B or on the external surfaces of the platforms 81A and 81B. It is important that the infrared light cutoff filter 82 be arranged to prevent infrared light from irradiating an area other than the area of the liquid crystal cell base material 113A having the uncured sealing member 14A formed therewithin.

The compression curing of the uncured sealing member 14A fabricated of a photosetting epoxy adhesive is now discussed.

In this embodiment, the uncured sealing member 14A, fabricated of a photosetting adhesive, is compression-cured using a sealing member compression curing apparatus. The sealing member compression curing apparatus includes an ultraviolet light emitter for irradiating, with ultraviolet light, at least the area of the liquid crystal cell base material 113A having the uncured sealing member 14A formed therewithin, and a pressurizing unit for pressurizing at least the area of the liquid crystal cell base material 113A having the uncured sealing member 14A formed therewithin.

In particular, to form a leak-free sealing member 14A, the sealing member compression curing apparatus to be used preferably includes a pressurizing unit for pressurizing only the area of the liquid crystal cell base material 113A having the uncured sealing member 14A formed therewithin. In order not to damage the liquid crystal layer 13, the sealing member compression curing apparatus preferably irradiates, with ultraviolet light, only the area of the liquid crystal cell base material 113A having the uncured sealing member 14A formed therewithin.

FIG. 10 shows a sealing member compression curing apparatus 90 which pressurizes only the area of the liquid crystal cell base material 113A having the uncured sealing member 14A formed therewithin, and which irradiates, with ultraviolet light, only the area of the liquid crystal cell base material 113A having the uncured sealing member 14A formed therewithin. FIG. 10 is a cross-sectional view of the sealing member compression curing apparatus 90 appropriate for use in the compression curing of the uncured sealing member 14A fabricated of a photosetting adhesive, illustrating the construction of the sealing member compression curing apparatus 90 and the compression curing of the uncured sealing member 14A.

FIG. 10 shows the sealing member compression curing apparatus 90 in which the liquid crystal cell base material 113A shown in FIG. 5(a) is placed. Referring to FIG. 10, components used in the sealing member compression curing apparatus 80 are identified with the same reference numerals. As shown in FIG. 10, layers and members are not necessarily consistently drawn to scale for easy identification.

Referring to FIG. 10, the sealing member compression curing apparatus 90 is chiefly composed of a pair of opposing platforms 91A and 91B with a predetermined spacing kept therebetween, and an infrared light emitter 93 for emitting ultraviolet light, including at least one ultraviolet lamp mounted external to the platforms 91A and 91B. The liquid crystal cell base material 113A is placed at a predetermined location in a space 87 formed between the platforms 91A and 91B to cure the uncured sealing member 14A. As shown in FIG. 10, one infrared light emitter 93 is arranged external to each of the platforms 91A and 91B.

The platforms 91A and 91B are fabricated of a transparent material, such as glass, and transmit ultraviolet light. The ultraviolet light emitter 93 has, on the external side thereof, a reflective mirror 84 having an inwardly looking concave surface 84a, to efficiently irradiate the platforms 91A and 91B with infrared light. As shown in FIG. 10, the spacing between the platforms 91A and 91B is set to be larger than the thickness of the liquid crystal cell base material 113A.

In this embodiment, the platforms 91A and 91B internally have a plurality of gas passages 86 and 88 in the platforms 91A and 91B. The gas passages 88 are opened at the surfaces of the platforms 91A and 91B facing the space 87, thereby forming a gas discharge unit (a pressurizing unit) 85. The gas passages 86, and 88 and the gas discharge unit 85 are respectively identical in construction to the gas passages 86, and 88 and the gas discharge unit 85 arranged inside or on the surface of the platforms 81A and 81B of the sealing member compression curing apparatus 80. The gas passages 86 are connected to gas supplies, although not shown, in the same way as the gas passages 86 in the sealing member compression curing apparatus 80.

Only the area of the liquid crystal cell base material 113A having the uncured sealing member 14A is compression-bonded as shown in FIG. 10. To pressurize only the area of the liquid crystal cell base material 113A having the uncured sealing member 14A formed therewithin, the gas passages 88 and the gas discharge unit 85 are arranged at locations inside and on the surfaces of the platforms 91A and 91B in alignment with the area of the liquid crystal cell base material 113A having the uncured sealing member 14A formed therewithin. The gas discharge unit 85 thus continuously discharges the gas at a predetermined pressure to only the area of the liquid crystal cell base material 113A having the uncured sealing member 14A formed therewithin.

Since the gas discharge unit 85 is arranged on the surface of each of the platforms 91A and 91B, the area of the liquid crystal cell base material 113A having the uncured sealing member 14A formed therewithin is under pressure with the gas discharged from the top and bottom gas discharge units 85. Accordingly, the uncured sealing member 14A is compression-bonded. The liquid crystal cell base material 113A is lifted as shown in FIG. 10. Optionally, the liquid crystal cell base material 113A may be beforehand fixed so that the liquid crystal cell base material 113A is spaced from the surfaces of the platforms 91A and 91B by predetermined spacings. To produce a leak-free sealing member 14A, the area of the liquid crystal cell base material 113A having the uncured sealing member 14A formed therewithin may be pressurized under a pressure of 0.05 MPa.

An ultraviolet light cutoff filter 92 is preferably arranged on each of the platforms 91A and 91B in the surfaces facing the space 87, other than the area of the gas discharge unit 85. Accordingly, when the ultraviolet light emitter 93 emits ultraviolet light with the uncured sealing member 14A pressurized, ultraviolet light is transmitted through the platforms 91A and 91B except for the area of the ultraviolet light cutoff filter 92. In other words, only the area of the liquid crystal cell base material 13A having the uncured sealing member 14A formed therewithin is irradiated with ultraviolet light. The curing of the uncured sealing member 14A is controlled by adjusting the strength of the ultraviolet light emitted by the ultraviolet light emitter 93.

When the sealing member compression curing apparatus 90 is employed, the liquid crystal layer 13 is not irradiated with the ultraviolet light. The irradiation condition on the uncured sealing member 14A with the ultraviolet light is subject to no particular limitations. The uncured sealing member 14A may be thus subjected to irradiation conditions within which the uncured sealing member 14A is curable.

Using the sealing member compression curing apparatus 90, only the area of the liquid crystal cell base material 113A having the uncured sealing member 14A formed therewithin is pressurized while only the area of the liquid crystal cell base material 113A having the uncured sealing member 14A formed therewithin is irradiated with ultraviolet light. The uncured sealing member 14A is efficiently compression-bonded, thereby leading to a leak-free sealing member 14. The uncured sealing member 14A is cured without damaging the liquid crystal layer 13.

In the above discussion, both platforms 91A and 91B have the gas discharge units 85 in the sealing member compression curing apparatus 90. However, the present invention is not limited this arrangement. It is acceptable if at least one of the platforms 91A and 91B is equipped with the gas discharge unit 85 on the surface thereof.

The sealing member compression curing apparatus 90 includes the ultraviolet light cutoff filter 92 on the side of each of the platforms 91A and 91B facing the spacing 87. However, the present invention is not limited to this arrangement. The ultraviolet light cutoff filter 92 may be arranged inside the platforms 91A and 91B or on the external surfaces of the platforms 91A and 91B. It is important that the ultraviolet light cutoff filter 92 be arranged to prevent infrared light from irradiating an area other than the area of the liquid crystal cell base material 113A having the uncured sealing member 14A formed therewithin.

In the above discussion of the sealing member compression curing apparatuses 70, 80, and 90, the gas discharge units 73 and 85 discharge the gas, thereby compression bonding the uncured sealing member 14A with the pressure of the gas. However, it is to be understood that the present invention is not limited to this. The pressurizing unit may mechanically pressurize the area of the liquid crystal cell base material 113A having the uncured sealing member 14A formed therewithin without departing from the spirit and the scope of the present invention.

The sealing member compression curing apparatuses 70, 80, and 90 are used not only in the manufacturing process of the liquid crystal device 1, but can also be used in the manufacturing process of conventional ordinary electro-optical devices. Further, the sealing member compression curing apparatuses 70, 80, and 90 find applications not only in the manufacturing process of electro-optical devices but also in the manufacturing process of a substrate assembly having a pair of opposing substrates bonded together with a sealing member interposed therebetween.

In this embodiment, the uncured adhesive is applied in a loop configuration in the peripheral portion of each counter substrate formation region 12a of the counter substrate base material 112A to form the uncured sealing member 14A having no injection port. The liquid crystal (the electro-optical material) is then applied in the internal area surrounded by the uncured sealing member 14A on each counter substrate formation region 12a of the counter substrate base material 112A. This method prevents the liquid crystal (the electro-optical material) from being stuck on the external surface of the sealing member 14. The manufacturing method for manufacturing the electro-optical device therefore dispenses with a cleaning process for the liquid crystal cell (the electro-optical material cell), and increases the production yield of the electro-optical device.

In accordance with this embodiment, the substrate base material 111A and the counter substrate base material 112A are bonded together to form the liquid crystal cell base material (the electro-optical cell base material) 113A, after forming the liquid crystal layer (the electro-optical material layer) 13 on each counter substrate formation region 12a of the counter substrate base material 112A. The liquid crystal cell base material (the electro-optical cell base material) 113A is directly diced into individual liquid crystal cells (the electro-optical material cells) 1A. This method dispenses with a dicing step for dicing the electro-optical cell base material into a rectangular electro-optical cell base material to introduce the electro-optical material in the manufacturing process of the conventional electro-optical device. The manufacturing process of the electro-optical device is thus simplified, and the production yield is improved.

In accordance with this embodiment, the sealing member 14 having no injection port is formed. A step for forming a sealing material for sealing the injection port in the manufacturing process of the conventional electro-optical device is eliminated. The manufacturing process of the electro-optical device is thus simplified, and the production yield is improved.

In accordance with this embodiment, the step of fabricating the liquid crystal layer (the electro-optical material layer) 13 preferably applies the liquid crystal using the dispenser or the ink-jet nozzle capable of discharging the droplet 61 of the liquid crystal (the electro-optical material). By applying the liquid crystal through the ink-jet application method using the ink-jet nozzle, a small quantity of liquid crystal is precisely applied.

In accordance with this embodiment, in the step of curing the uncured sealing member 14A to form a leak-free sealing member 14, the area of the liquid crystal cell base material 113A having the uncured sealing member 14A formed therewithin is preferably compression bonded from outside the liquid crystal cell base material 113A.

The uncured sealing member 14A is bonded more efficiently by pressurizing the area of the liquid crystal cell base material (electro-optical cell base material) 113A having the uncured sealing member 14A formed therewithin than by pressurizing the entire liquid crystal cell base material 113A. A leak-free sealing member 14 thus results.

Currently, no technique was conventionally available to pressurize only the area of the liquid crystal cell base material (the electro-optical cell base material) having the uncured sealing member formed therewithin. However, in accordance with the present invention, only the area of the liquid crystal cell base material (the electro-optical cell base material) 113A having the uncured sealing member 14A formed therewithin is pressurized using one of the sealing member compression curing apparatuses 70, 80, and 90. In accordance with this embodiment, the manufacturing method for manufacturing the electro-optical device results in a leak-free sealing member 14.

When the uncured sealing member 14A is fabricated of a thermosetting adhesive, the liquid crystal cell base material (the electro-optical cell base material) 113A is preferably heated to within a temperature range of 100° C. to 160° C. for a heating time of 30 minutes to 60 minutes in the step of curing the uncured sealing member 14A. With the liquid crystal cell base material (the electro-optical cell base material) 113A heated to within a temperature range of 100° C. to 160° C. for a heating time of 30 minutes to 60 minutes, the uncured sealing member 14A is cured without incurring any damage to the liquid crystal layer (the electro-optical material layer) 13.

In order to avoid damaging the liquid crystal layer (the electro-optical material layer) in the course of curing the uncured sealing member 14A fabricated of the thermosetting adhesive, only the area of the liquid crystal cell base material (the electro-optical cell base material) 113A having the uncured sealing member 14A formed therewithin is preferably heated.

Currently, no technique was conventionally available to heat only the area of the liquid crystal cell base material (the electro-optical cell base material) having the uncured sealing member formed therewithin. However, in accordance with the present invention, only the area of the liquid crystal cell base material (the electro-optical cell base material) 113A having the uncured sealing member 14A formed therewithin is heated using one of the sealing member compression curing apparatuses 70, 80, and 90. In accordance with this embodiment, the manufacturing method for manufacturing the electro-optical device incurs no damage to the liquid crystal layer (the electro-optical material layer) 13 in the heating operation.

When the uncured sealing member 14A is fabricated of a photosetting adhesive, only the area of the liquid crystal cell base material (the electro-optical cell base material) 113A having the uncured sealing member 14A formed therewithin is preferably irradiated with ultraviolet light in the step of curing the uncured sealing member 14A.

Currently, no technique was conventionally available to irradiate, with ultraviolet light, only the area of the liquid crystal cell base material (the electro-optical cell base material) having the uncured sealing member formed therewithin. However, in accordance with the present invention, only the area of the liquid crystal cell base material (the electro-optical cell base material) 113A having the uncured sealing member 14A formed therewithin is irradiated with ultraviolet light using one of the sealing member compression curing apparatuses 70, 80, and 90. In accordance with this embodiment, the manufacturing method for manufacturing the electro-optical device incurs no damage to the liquid crystal layer (the electro-optical material layer) 13.

Since the liquid crystal device 1 of this embodiment manufactured in accordance with the manufacturing method for manufacturing the electro-optical device forms the sealing member 14 having no injection port, the sealing material for sealing an injection port is not formed, either. This arrangement permits space-saving design to be implemented in the electronic equipment incorporating the liquid crystal device (the electro-optical device) 1.

FIG. 11 is a cross-sectional view taken along a plane perpendicular to the surface of a substrate of a liquid crystal device 2 of a second embodiment of the present invention, which employs a TFT (Thin-Film Transistor) as a switching element. FIG. 12 is a plan view showing the liquid crystal device 2, viewed from the side of an upper substrate. FIG. 11 is the cross-sectional view of the liquid crystal device 2 of FIG. 12, taken along line A2–A2'. The construction of the liquid crystal device 2 is now discussed. As shown in FIG. 11 and FIG. 12, layers and members are not necessarily consistently drawn to scale for easy identification.

The lower substrate of the liquid crystal device 2 is similar in construction to that of the first embodiment shown in FIG. 3, and the discussion thereof is not repeated. Further, components identical those described in the first embodiment are designated with the same reference numerals, and the discussion thereof is not repeated.

Referring to FIG. 11, the (lower) substrate 101 and the counter (upper) substrate 102 are bonded together with a sealing member 104 interposed therebetween with a predetermined gap maintained therebetween. A liquid crystal layer (an electro-optical layer) 13 is encapsulated between the substrate 101 and the counter substrate 102. The sealing member 104 is fabricated of a thermosetting epoxy adhesive or a photosetting epoxy adhesive. Referring to FIG. 12, the substrate 101 and the counter substrate 102 have the same width dimension thereacross but have different vertical dimensions in this embodiment, as the substrate 11 and the counter substrate 12 do in the first embodiment. The vertical dimension of the substrate 101 is larger than the vertical dimension of the counter substrate 102.

In this embodiment, as shown in FIG. 12, the sealing member 104, having a rectangular loop, extends along the four sides of the substrate 101 and the counter substrate 102 between the respective peripheral portions of the substrate 101 and the counter substrate 102. Referring to FIG. 11 and FIG. 12, the external end faces 104e of the sealing member 104 are flush with the end faces 102e of the counter substrate 102. The sealing member 104 has no injection port through which the liquid crystal could be introduced into the sealing member 104. Accordingly, the construction of the liquid crystal device 2 is generally the same in construction to the liquid crystal device 1 in the first embodiment, except for the formation area of the sealing member 14.

The manufacturing method for manufacturing the electro-optical device of this embodiment is now discussed in conjunction with the above-referenced liquid crystal device 2. FIGS. 13(a)–13(c) and FIGS. 14(a)–14(c) illustrate the manufacturing processes of the liquid crystal device 2. The manufacturing method of the liquid crystal device 2 is now discussed. FIGS. 13(a)–13(c) and FIGS. 14(a)–14(c) are diagrammatic plan views.

To perform mass production and to simplify the manufacturing process, the liquid crystal device 2 is manufactured using a substrate base material 111B shown in FIG. 13(a), which is diced into a plurality of the substrates 101, and a counter substrate base material 112B shown in FIG. 13(b), which is diced into a plurality of the counter substrates 102.

Regions of the substrate base material 111B and the counter substrate base material 112B, respectively becoming the substrates 101 and the counter substrates 102, are respectively referred to as a substrate formation region 101a and a counter substrate formation region 102a. The number of the substrate formation regions 101a in the substrate base material 111B and the number of the counter substrate formation regions 102a in the counter substrate base material 112B are determined by the areas of the substrate 101 and the counter substrate 102 and the areas of the substrate base material 111B and the counter substrate base material 112B. Referring to FIGS. 13(a) and 13(b), the substrate base material 111B includes six substrate formation regions 101a and the counter substrate base material 112B includes six counter substrate formation regions 102a. The present invention is not limited to the number and the layout of the substrate formation regions 101a and counter substrate formation regions 102a shown in FIGS. 13(a) and 13(b).

The substrate formation region 101a and the counter substrate formation region 102a are respectively formed in the predetermined locations in the substrate base material 111B and the counter substrate base material 112B so that the substrate formation regions 101a are opposed to the counter substrate formation regions 102a when the substrate base material 111B and the counter substrate base material 112B are bonded together. In this embodiment, the substrate formation regions 101a are laterally arranged side by side with no spacing introduced therebetween in the substrate base material 111B, and the counter substrate formation regions 102a are laterally arranged side by side with no spacing introduced therebetween in the counter substrate base material 112B.

The pixel electrodes 15, the TFTs 10, the alignment layer 18, etc., required for the substrate 101 are formed on the surface of each substrate formation region 101a of the substrate base material 111B, though these components are not shown. The color filter layer 16, the common electrode 17, and the alignment layer 19 required for the counter substrate 102 are formed on the surface of each substrate formation region 102a of the counter substrate base material 1112B, although these components are not shown.

An uncured sealing member 104A fabricated of a thermosetting epoxy adhesive or a photosetting epoxy adhesive is applied in a loop configuration in the peripheral portion of each counter substrate formation region 102a of the counter substrate base material 112B. The spacers 43, although not shown, are dispersed in the counter substrate formation region 102a.

In a vacuum, the liquid crystal (the electro-optical material) is applied in the internal region surrounded by the uncured sealing member 104A in each counter substrate formation region 102a on the surface of the counter substrate base material 112B. The liquid crystal layer 13 is thus formed. FIG. 13(c) shows the counter substrate base material 112B with the liquid crystal layer 13 formed thereon. The method of forming the liquid crystal layer 13 remains unchanged from the manufacturing method already discussed in conjunction with the first embodiment, and the discussion thereof is not repeated here.

In a vacuum, the substrate base material 111B and the counter substrate base material 112B are bonded together with the uncured sealing member 104A interposed therebetween so that the substrate formation regions 101a are respectively opposed in alignment with the respective counter substrate formation regions 102a. A liquid crystal cell base material (an electro-optical cell base material) 113B thus results. In this case, the substrate base material 111B and the counter substrate base material 112B must be bonded together so that the alignment layer 18 formed on the substrate formation region 101a is opposed in alignment with the alignment layer 19 formed on the counter substrate formation region 102a.

FIG. 14(a) is a plan view showing the liquid crystal cell base material 113B viewed from the side of the counter substrate base material 112B. Referring to FIG. 14(a), the liquid crystal cell base material 113B includes the substrate formation regions 101a and the respective counter substrate formation regions 102a bonded together with the sealing member 104A interposed therebetween, thereby including six liquid crystal cells (six electro-optical cells) 2A, each composed of one substrate formation region 101a and one counter substrate formation region 102a with the liquid crystal layer 13 encapsulated therebetween.

Referring to FIG. 14(b), the uncured sealing member 104A is cured in each liquid crystal cell 2A in the liquid crystal cell base material 113B. Finally, the sealing member 104A is formed. The method of curing the uncured sealing member 104A remains unchanged from the curing method already discussed in conjunction with the first embodiment and the discussion thereof is not repeated here.

Referring to FIG. 14(c), by dicing the liquid crystal cell base material 113B along the outline of each substrate formation region 101a and each counter substrate formation region 102a, individual liquid crystal cells 2A are formed. The substrate 101 and the counter substrate 102 are formed. The liquid crystal layer 13 is then subjected to an isotropic process. The optical elements, such as a retardation film and a polarizer, are mounted on the external surface of each of the substrate 101 and the counter substrate 102. The liquid crystal device 2 thus results.

In this embodiment, the uncured adhesive is applied in a loop configuration in the peripheral portion of each counter substrate formation region 102a of the counter substrate base material 112B to form the uncured sealing member 104A having no injection port. The liquid crystal (the electro-optical material) is then applied in the internal area surrounded by the uncured sealing member 104A on each counter substrate formation region 102a of the counter substrate base material 112B. This method prevents the liquid crystal (the electro-optical material) from being stuck on the external surface of the sealing member 104. The manufacturing method for manufacturing the electro-optical device therefore dispenses with a cleaning process for the liquid crystal cell (the electro-optical material cell), and increases the production yield of the electro-optical device.

In accordance with this embodiment, the substrate base material 111B and the counter substrate base material 112B are bonded together to form the liquid crystal cell base material (the electro-optical cell base material) 113B, after forming the liquid crystal layer (the electro-optical material layer) 13 on each counter substrate formation region 102a of the counter substrate base material 112B. The liquid crystal cell base material (the electro-optical cell base material) 113B is directly diced into individual liquid crystal cells (the electro-optical material cells) 2A. This method dispenses with a dicing step for dicing the electro-optical cell base material into a rectangular electro-optical cell base material to introduce the electro-optical material in the manufacturing process of the conventional electro-optical device. The manufacturing process of the electro-optical device is thus simplified, and the production yield is improved.

In accordance with this embodiment, the sealing member 104 having no injection port is formed. A step for forming a sealing material for sealing the injection port in the manufacturing process of the conventional electro-optical device is eliminated. The manufacturing process of the electro-optical device is thus simplified, and the production yield is improved.

Since the liquid crystal device 2 of this embodiment manufactured in accordance with the manufacturing method for manufacturing the electro-optical device forms the sealing member 104 having no injection port, the sealing material for sealing an injection port is not formed, either. This arrangement permits space-saving design to be implemented in the electronic equipment incorporating the liquid crystal device (the electro-optical device) 2.

Since the external end faces 104e of the sealing member 104 are flush with the end faces 102e of the counter substrate 102 in the liquid crystal device 2, the occupied space surrounding the sealing member 104 is narrow. The area of the substrates 101 and 102 is reduced. A space-saving design is thus implemented in the electronic equipment incorporating the liquid crystal device 2. Since the area of the substrates 101 and 102 in the liquid crystal device 2 are reduced in area, the substrate base material 111B and the counter substrate base material 112B are fully utilized.

The first and second embodiments have been discussed in connection with the electro-optical device that is manufactured of the substrate base material. The present invention is equally applied to an electro-optical device that is not manufactured from a substrate base material.

In this case, an uncured adhesive is applied in a loop configuration in a peripheral portion of one of a pair of substrates to form an uncured sealing member having no injection port. An electro-optical material is applied in an area surrounded by the uncured sealing member on the substrate to form an electro-optical material layer. The substrate and the other substrate are bonded together with the sealing member interposed therebetween to form an electro-optical cell. The uncured sealing member is then cured. Like the case in which the substrate base material is used, this manufacturing method for manufacturing the electro-optical device requires no cleaning process, thereby increasing production yield.

The first and second embodiments have been discussed in connection with the liquid crystal device employing the TFTs. The present invention is not limited to this and may be applied to any type of liquid crystal devices. For example, the present invention may be applied to a passive-matrix liquid crystal device or an active-matrix liquid crystal device employing a two-terminal element such as a TFD (Thin-Film Diode).

The present invention is not limited to the liquid crystal device. The present invention may be applied to electro-optical devices such as an electroluminescence having a structure that includes a pair of substrates with a predetermined spacing kept therebetween and holding an electro-optical material layer therebetween, or a plasma display.

Electronic equipment incorporating one of the liquid crystal device 1 in the first embodiment and the liquid crystal device 2 in the second embodiment of the present invention is specifically discussed.

FIG. 15(a) is a perspective view showing a mobile telephone. Referring to FIG. 15(a), there are shown a mobile telephone body 500, and a liquid crystal display unit 501 of one of the liquid crystal device 1 and the liquid crystal device 2.

FIG. 15(b) is a perspective view showing a mobile information processing apparatus such as a word processor or a personal computer. Referring to FIG. 15(b), there are shown an information processor 600, an input section 601 such as a keyboard, an information processor main unit 603, and a liquid crystal display unit 602 incorporating one of the liquid crystal device 1 and the liquid crystal device 2.

FIG. 15(c) is a perspective view showing an electronic wristwatch. Referring to FIG. 15(c), there are shown a wristwatch body 700, and a liquid crystal display unit 701 incorporating one of the liquid crystal device 1 and the liquid crystal device 2.

FIG. 16 is a block diagram showing a projection-type display device incorporating one of the liquid crystal device 1 and the liquid crystal device 2 as the light modulator thereof. Referring to FIG. 16, there are shown a light source 810, dichroic mirrors 813, and 814, reflective mirrors 815, 816, and 817, an entrance lens 818, a relay lens 819, an exit lens 820, liquid crystal light modulators 822, 823, and 824, a cross-dichroic prism 825, and a projection lens 826.

The light source 810 is composed of a lamp 811, such as a metal halide lamp, and a reflector 812 for reflecting light from the lamp. The blue/green-reflecting dichroic mirror 813 transmits red light of a luminous flux from the light source 810, while reflecting blue and green light. The red light transmitted therethrough is reflected from the reflective mirror 817, and is incident on the red-light liquid crystal light modulator 822.

The green light of the luminous flux reflected from the dichroic mirror 813 is reflected from the green reflecting dichroic mirror 814, and is incident on the green light liquid crystal light modulator 823. The blue light is transmitted through the second dichroic mirror 814. A light guide means 821, composed of the entrance lens 818, the relay lens 819, and the exit lens 820, is arranged for the blue light to compensate for a light loss due to a longer light path. Through the light guide means 821, the blue light is incident on the blue light liquid crystal light modulator 824.

The three color light rays modulated by the respective light modulators are incident on a cross-dichroic prism 825. The cross-dichroic prism 825 is constructed by gluing four rightangle prisms with a dielectric multilayered film reflecting the red light and a dielectric multilayered film reflecting the blue light interposed in a cross configuration at the interfaces between the rightangle prisms. These dielectric multilayered films synthesize the three color light beams. The synthesized light beam is projected onto a screen 827 through the projection lens 826 as a projection optical system. A resulting image is thus enlarged and displayed on the screen 827.

Electronic equipment shown in FIGS. 15(a)–15(c) and FIG. 16 incorporate one of the liquid crystal device 1 and the liquid crystal device 2, thereby implementing space-saving design.

As described above, in accordance with the present invention, an uncured adhesive is applied in a loop configuration in the peripheral portion of each substrate formation region of the one of the pair substrate base materials to form an uncured sealing member having no injection port. An electro-optical material is applied in the internal area surrounded by the uncured sealing member in each substrate formation region of the substrate base material. The electro-optical material is prevented from being stuck on the external surface of the sealing member in this way. The present invention thus provides the manufacturing method for manufacturing the electro-optical device, which eliminates a cleaning process for the electro-optical cell and results in a high production yield.

In accordance with the manufacturing method of the present invention, the pair of substrate base materials are bonded together after forming the electro-optical layer in each substrate formation region on one of the pair of substrate base materials. The electro-optical cell base material is thus formed and is then diced into individual electro-optical cells. This method eliminates the need for a step of dicing an electro-optical cell material into a rectangular electro-optical cell to introduce an electro-optical material in the manufacturing process of conventional electro-optical devices. The manufacturing method of this invention therefore simplifies the manufacturing process of the electro-optical device while increasing production yield thereof.

Since the sealing member has no injection port, a sealing step for applying a sealing material, which would be required to close an injection port in the manufacturing process of the conventional electro-optical device, is dispensed with. The manufacturing process of the electro-optical device is thus simplified and the production yield thereof is increased.

In accordance with the present invention, the step of fabricating the electro-optical material layer preferably applies the liquid crystal using the dispenser or the ink-jet nozzle capable of discharging the droplet of the electro-optical material. By applying the electro-optical material through the ink-jet application method using the ink-jet nozzle, a small quantity of electro-optical material is precisely applied.

In accordance with the present invention, to produce a leak-free sealing member, the step of curing the uncured sealing member preferably cures the uncured sealing member by compression-bonding only an area of one of the electro-optical cell base material having the uncured sealing member formed therewithin, from outside the electro-optical cell base material.

By compression-bonding at least the area of one of the electro-optical cell base material having the uncured sealing member formed therewithin, from outside the electro-optical cell base material, the uncured sealing member is efficiently bonded rather than by pressurizing entirely the electro-optical cell base material. A leak-free sealing member thus results.

As described above, no technique was conventionally available to pressurize only the area of the electro-optical cell base material having the uncured sealing member formed therewithin. The inventors of this invention have developed the sealing member compression curing apparatus which enables the area of the electro-optical cell base material having the uncured sealing member formed therewithin, to be pressurized.

With the sealing member compression curing apparatus, only the area of the electro-optical cell base material having the uncured sealing member is pressurized. The manufacturing method for manufacturing the electro-optical device forming a leak-free sealing member is thus provided.

When the uncured sealing member is fabricated of a thermosetting adhesive, the electro-optical cell base material is preferably heated to within a temperature range of 100° C. to 160° C. for a heating time of 30 minutes to 60 minutes in the step of curing the uncured sealing member. With the electro-optical cell base material heated to within a temperature range of 100° C. to 160° C. for a heating time of 30 minutes to 60 minutes, the uncured sealing member is cured without incurring any damage to the electro-optical material layer.

In order to avoid damaging the electro-optical material layer in the course of curing the uncured sealing member fabricated of the thermosetting adhesive, only the area of the electro-optical cell base material having the uncured sealing member formed therewithin is preferably heated.

As described above, no technique was conventionally available to heat only the area of the electro-optical cell base material having the uncured sealing member formed therewithin. The present invention provides a sealing member compression curing apparatus which enables the area of the electro-optical cell base material having the uncured sealing member formed therewithin, to be heated.

With the sealing member compression curing apparatus, only the area of the electro-optical cell base material having the uncured sealing member is heated. The manufacturing method for manufacturing the electro-optical device not damaging the electro-optical material layer is thus provided.

When the uncured sealing member is fabricated of a photosetting adhesive, only the area of the electro-optical cell base material having the uncured sealing member formed therewithin is preferably irradiated with ultraviolet light in the step of curing the uncured sealing member.

As described above, no technique was conventionally available to irradiate, with ultraviolet light, only the area of the electro-optical cell base material having the uncured sealing member formed therewithin. The present invention provides a sealing member compression curing apparatus which enables the area of the electro-optical cell base material having the uncured sealing member formed therewithin, to be irradiated with ultraviolet light.

With the sealing member compression curing apparatus, only the area of the electro-optical cell base material having the uncured sealing member is irradiated with ultraviolet light. The manufacturing method for manufacturing the electro-optical device not damaging the electro-optical material layer is thus provided.

The electro-optical device of the present invention includes the pair of opposing substrates bonded to each other with the sealing member interposed therebetween and with a predetermined spacing kept therebetween, and the electro-optical material layer encapsulated between the pair of opposing substrates. The sealing member, having no injection port, runs in a loop configuration on the peripheral portions of the pair substrates.

Since the electro-optical device includes the sealing member having no injection port, no sealing material is formed, and a space-saving design is implemented in the electronic equipment incorporating the electro-optical device.

In the electro-optical device of the present invention, the external end faces of the sealing member are flush with the end faces of one of the pair of substrates.

Since the occupied space surrounding the sealing member is narrow, the area of the substrates is reduced. A space-saving design is thus implemented in the electronic equipment incorporating the electro-optical device. Since the area of the substrates in the electro-optical device is reduced, the substrate base material is fully utilized.

With the electro-optical device incorporated, space-saving electronic equipment results.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for manufacturing an electro-optical device including a sealing member that is formed to bond a pair of opposing substrates that encapsulate an electro-optical layer therebetween, and a pair of substrate base materials, each of which includes a plurality of substrate formation regions on which the respective substrates are formed, the method of comprising:

forming an uncured sealing member by applying an uncured adhesive in a loop configuration in a peripheral portion of each substrate formation region of one of the pair of substrate base materials;

fabricating an electro-optical layer by applying an electro-optical material in an internal area surrounded by the uncured sealing member in each substrate formation region of the substrate base material;

assembling an electro-optical cell base material by bonding the one substrate base material to the other substrate base material with the uncured sealing member interposed therebetween;

curing the uncured sealing member of the electro-optical cell base material; and dicing the electro-optical cell base material along each substrate formation region;

the step of fabricating the electro-optical layer including applying the electro-optical material on the one substrate in the internal area surrounded by the uncured sealing member using an ink-jet nozzle that discharges droplets of the electro-optical material;

wherein when the electro-optical material is applied, the viscosity of the electro-optical material is within a range from 1 to 50 mPaxs; and the step of curing the uncured sealing member includes curing the uncured sealing member by irradiating, with ultraviolet light, only the area of the electro-optical cell base material, having the uncured sealing member formed therewithin.

2. The method for manufacturing an electro-optical device according to claim 1, the step of fabricating the electro-optical layer including applying the electro-optical material on the one substrate in the internal area surrounded by the uncured sealing member using a dispenser that discharges droplets of the electro-optical material.

3. The method for manufacturing an electro-optical device according to claim 1, wherein when the electro-optical material is applied, the viscosity of the electro-optical material is within a range from 1 to 10 mPaxs.

4. The method for manufacturing an electro-optical device according to claim 1, the step of curing the uncured sealing member including curing the uncured sealing member by compression-bonding at least an area of the electro-optical cell base material, having the uncured sealing member formed therewithin, from outside of the electro-optical cell base material.

5. The method for manufacturing an electro-optical device according to claim 4, the step of curing the uncured sealing member further including curing the uncured sealing member by pressurizing only an area of the electro-optical cell base material, having the uncured sealing member formed therewithin.

6. The method for manufacturing an electro-optical device according to claim 5, the step of curing the uncured sealing member further comprising pressurizing only an area of the electro-optical cell base material, having the uncured sealing member formed therewithin, by discharging a gas onto the area of the electro-optical cell base material, having the uncured sealing member formed therewithin, from outside the electro-optical cell base material.

7. The method for manufacturing an electro-optical device according to claim 1, wherein the uncured sealing member is fabricated of a thermosetting adhesive, and
the step of curing the uncured sealing member includes curing the uncured sealing member by heating the electro-optical cell base material to within a range from 100° C. to 160° C. for a heating time of 30 to 60 minutes.

8. The method for manufacturing an electro-optical device according to claim 1, wherein the uncured sealing member is fabricated of a thermosetting adhesive, and
the step of curing the uncured sealing member includes curing the uncured sealing member by heating only the area of the electro-optical cell base material, having the uncured sealing member formed therewithin.

9. The method for manufacturing an electro-optical device according to claim 1, wherein the uncured sealing member is fabricated of a photosetting adhesive, and
the step of curing the uncured sealing member includes curing the uncured sealing member by irradiating, with ultraviolet light, only the area of the electro-optical cell base material, having the uncured sealing member formed therewithin.

10. A method for manufacturing an electro-optical including a sealing member that is formed to bond a pair of opposing substrates that encapsulate an electro-optical layer therebetween, the method comprising: forming an uncured sealing member having no injection port by applying an uncured adhesive in a loop configuration in a peripheral portion of one of the pair of substrates;
fabricating an electro-optical layer by applying an electro-optical material on the one substrate in an internal area surrounded by the uncured sealing member;
assembly an electro-optical cell by bonding the one substrate to the other substrate with the uncured sealing member interposed therebetween; and
curing the uncured sealing member of the electro-optical cell;
the step of fabricating the electro-optical layer including applying the electro-optical material on the one substrate in the internal area surrounded by the uncured sealing member using an in-jet nozzle that discharges droplets of the electro-optical material; and
wherein when the electro-optical material is applied, the viscosity of the electro-optical material is within a range from 1 to 50 mPaxs.

11. The method for manufacturing an electro-optical device according to claim 10, the step of fabricating the electro-optical layer including applying the electro-optical material on the one substrate in the internal area surrounded by the uncured sealing member using a dispenser that discharges droplets of the electro-optical material.

12. The method for manufacturing an electro-optical device according to claim 10, wherein when the electro-optical material is applied, the viscosity of the electro-optical material is within a range from 1 to 10 mPaxs.

13. The method for manufacturing an electro-optical device according to claim 1 the step of curing the uncured sealing member including curing the uncured sealing member by compression-bonding at least an area of the electro-optical cell, having the uncured sealing member formed therewithin, from outside of the electro-optical cell.

14. The method for manufacturing an electro-optical device according to claim 13, the step of curing the uncured sealing member further including curing the uncured sealing member by pressurizing only an area of the electro-optical cell, having the uncured sealing member formed therewithin.

15. The method for manufacturing an electro-optical device according to claim 14, the step of curing the uncured sealing member further comprising pressurizing only an area of the electro-optical cell, having the uncured sealing member formed therewithin, by discharging a gas onto the area of the electro-optical cell, having the uncured sealing member formed therewithin, from outside the electro-optical cell.

16. The method for manufacturing an electro-optical device according to claim 12, wherein the uncured sealing member is fabricated of a thermosetting adhesive, and
the step of curing the uncured sealing member includes curing the uncured sealing member by heating the electro-optical cell to within a range from 100° C. to 160° C. for a heating time of 30 to 60 minutes.

17. The method for manufacturing an electro-optical device according to claim 10, wherein the uncured sealing member is fabricated of a thermosetting adhesive, and
the step of curing the uncured sealing member includes curing the uncured sealing member by heating only the area of the electro-optical cell, having the uncured sealing member formed therewithin.

18. The method for manufacturing an electro-optical device according to claim 10, wherein the uncured sealing member is fabricated of a photosetting adhesive, and
the step of curing the uncured sealing member includes curing the uncured sealing member by irradiating, with ultraviolet light, only the area of the electro-optical cell, having the uncured sealing member formed therewithin.

19. A sealing member compression curing apparatus which cures an uncured sealing member of a substrate assembly by compression-bonding the uncured sealing member from outside the substrate assembly after manufacturing the substrate assembly by mutually bonding a pair of opposing substrates with the uncured sealing member made of a thermosetting adhesive and interposed therebetween, the sealing member compression curing apparatus comprising:
a heater unit that heats at least an area of the substrate assembly having the uncured sealing member formed therewithin to a predetermined temperature; and
a pressurizing unit that pressurizes at least the area of the substrate assembly having the uncured sealing member formed therewith;
the pressurizing unit only pressurizing the area of the substrate assembly having the uncured sealing member formed therewithin; and the pressurizing unit comprising a gas discharge unit for discharging a gas to the area of the substrate assembly having the uncured sealing member formed therewithin.

20. The sealing member compression curing apparatus according to claim 19, further comprising a pair of platforms opposed to each other with a predetermined spacing maintained therebetween, the pair of platforms forming an internal space in which the substrate assembly is mounted, and at least one of the pair of platforms including, on the surface thereof facing the internal space, a plurality of gas discharge units that discharge a gas to the area of the substrate assembly having the uncured sealing member formed therewithin.

21. The sealing member compression curing apparatus according to claim 19, further comprising a pair of platforms opposed to each other with a predetermined spacing maintained therebetween, the pair of platforms forming an internal space in which the substrate assembly is mounted, and at least one of the pair of platforms being the heater unit that is heated to heat the substrate assembly mounted in the internal space.

22. The sealing member compression curing apparatus according to claim 19, the heater unit heating only the area of the substrate assembly having the uncured sealing member formed therewithin.

23. The sealing member compression curing apparatus according to claim 22, the heater unit being an infrared light emitter that irradiates, with infrared light, only the area of the substrate assembly having the uncured sealing member formed therewithin so that only the area of the substrate assembly having the uncured sealing member therewithin is heated.

24. The sealing member compression curing apparatus according to claim 23, further comprising an infrared cutoff filter for preventing infrared light from irradiating an area other than the area of the substrate assembly having the uncured sealing member formed therewithin.

25. The sealing member compression curing apparatus according to claim 24, comprising a pair of platforms opposed to each other with a predetermined spacing maintained therebetween, and permitting infrared light to transmit therethrough, and forming an internal space in which the substrate assembly is mounted, at least one infrared light emitter being arranged on the pair of platforms on an external side thereof, and at least one of the pair of platforms including the infrared cutoff filter on an internal side or the external side thereof that prevents infrared light from irradiating the area other than the area of the substrate assembly having the uncured sealing member formed therewithin so that infrared light emitted by the infrared light emitter irradiates only the area of the substrate assembly having the uncured sealing member formed therewithin.

26. A sealing member compression curing apparatus which cures an uncured sealing member of a substrate assembly by compression-bonding the uncured sealing member from outside the substrate assembly after manufacturing the substrate assembly by mutually bonding a pair of opposing substrates within the uncured sealing member made of a photosetting adhesive and interposed therebetween, the sealing member compression curing apparatus comprising:

an ultraviolet light emitter that irradiates, with ultraviolet light, at least an area of the substrate assembly having the uncured sealing member formed therewith;

a pressurizing unit that pressurizes at least the area of the substrate assembly having the uncured sealing member formed therewithin;

the pressurizing unit pressurizing only the area of the substrate assembly having the uncured sealing member formed therewithin; and the pressurizing unit being a gas discharge unit for discharging a gas to the area of the substrate assembly having the uncured sealing member formed therewithin.

27. The sealing member compression curing apparatus according to claim 26, further comprising a pair of platforms opposed to each other with a predetermined spacing maintained therebetween, the pair of platforms forming an internal space in which the substrate assembly is mounted, and at least one of the pair of platforms including, on the surface thereof facing the internal space, a plurality of gas discharge units that discharge a gas to the area of the substrate assembly having the uncured sealing member formed therewithin.

28. The sealing member compression curing apparatus according to claim 26, ultraviolet light emitted from the ultraviolet light emitter irradiating only the area of the substrate assembly having the uncured sealing member formed therewithin.

29. The sealing member compression curing apparatus according to claim 28, further comprising an ultraviolet cutoff filter that prevents ultraviolet light from irradiating an area other than the area of the substrate assembly having the uncured sealing member formed therewithin.

30. The sealing member compression curing apparatus according to claim 29, comprising a pair of platforms opposed to each other with a predetermined spacing maintained therebetween, the pair of platforms permit the ultraviolet light to transmit therethrough and form an internal space in which the substrate assembly is mounted, at least one ultraviolet light emitter being arranged on the pair of platforms on external sides thereof, and at least one of the pair of platforms including an ultraviolet cutoff filter on an internal side or the external side thereof for preventing ultraviolet light from irradiating the area other than the area of the substrate assembly having the uncured sealing member formed therewithin, and the ultraviolet light emitted from the ultraviolet light emitter irradiating only the area of the substrate unit having the uncured sealing member formed therewithin.

* * * * *